United States Patent [19]

Ramanathan et al.

[11] 4,068,085
[45] Jan. 10, 1978

[54] 3-NITRO-5-AZOPYRIDINE DYESTUFFS

[75] Inventors: Visvanathan Ramanathan, Basel, Switzerland; Ulrich Schlesinger, Maulburg, Baden, Germany; René De Montmollin, Riehen, Switzerland

[73] Assignee: Ciba-Geigy Corporation, Ardsley, N.Y.

[21] Appl. No.: 636,487

[22] Filed: Dec. 1, 1975

[30] Foreign Application Priority Data

Dec. 6, 1974 Switzerland .................. 16253/74

[51] Int. Cl.$^2$ .................. C09B 29/36; C09B 62/08; C09B 62/24; D06P 3/52
[52] U.S. Cl. .................. 260/156; 260/146 D; 260/146 T; 260/147; 260/153; 260/154; 260/270 E; 260/294.8 F; 260/294.9; 260/296 R
[58] Field of Search .......... 260/146 R, 146 T, 146 D, 260/153, 154, 156, 147

[56] References Cited
U.S. PATENT DOCUMENTS

| | | | |
|---|---|---|---|
| 1,680,109 | 8/1928 | Ostromislensky | 260/156 |
| 2,068,353 | 1/1937 | Schneiderwirth | 260/156 |
| 2,156,141 | 4/1939 | Binz et al. | 260/156 |
| 2,783,224 | 2/1957 | Green et al. | 260/156 |
| 3,249,597 | 5/1966 | Dehn et al. | 260/156 |
| 3,869,440 | 3/1975 | Back et al. | 260/146 T |
| 3,907,769 | 9/1975 | Dehnert et al. | 260/156 |

Primary Examiner—Floyd D. Higel
Attorney, Agent, or Firm—Edward McC. Roberts; Prabodh I. Almaula; Michael W. Glynn

[57] ABSTRACT

An azo dyestuff of the formula

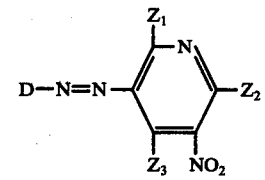

wherein two of the radicals Z denote groups of the formula —NR'R" and one radical Z denotes a group of the formulae —NR'R", —OR' or —S-R', and R' and R" and R" each denote hydrogen, aryl, aralkyl, cycloalkyl or an aliphatic radical and R' and R" can form a ring containing the amine nitrogen and the radicals —NR'R" can be identical to, or different from, one another, $Z_3$ is also a hydrogen, chlorine or bromine atom or an optionally substituted hydrocarbon radical and D is the radical of an aromatic or heterocyclic diazo component. The new dyestuffs dye synthetic fibers, such as polyester and acrylic fibers in fast yellow, and red shades.

16 Claims, No Drawings

3-NITRO-5-AZOPYRIDINE DYESTUFFS

The present invention relates to new valuable azo dyestuffs of the general formula

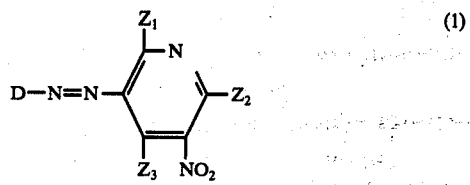

wherein two of the radicals Z denote groups of the formula —NR'R" and one radical Z denotes a group of the formulae —NR'R"', -OR''' or -S-R''', and R', R" and R''' each denote hydrogen, aryl, aralkyl, cycloalkyl or an aliphatic radical and R' and R" can form a ring containing the amine nitrogen and the radicals —NR'R" can be identical to, or different from, one another; $Z_3$ is also a hydrogen, chlorine or bromine atom or an optionally substituted hydrocarbon radical, especially an alkyl radical, and D is the radical of an aromatic or heterocyclic diazo component.

Preferred embodiments are the dyestuffs, which are free from sulphuric acid groups, of the formula

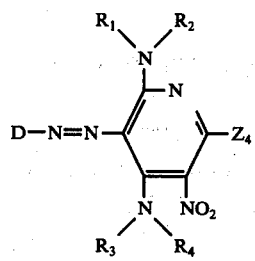

and

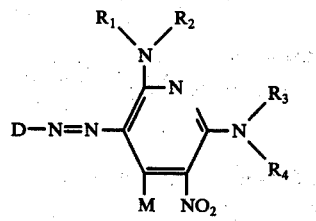

wherein M denotes hydrogen, optionally substituted alkyl or optionally substituted phenyl, $R_1$, $R_2$, $R_3$ and $R_4$ each denote hydrogen or an aryl, aralkyl or cycloalkyl radical or an aliphatic radical, it being possible for $R_1$ and $R_2$ and for $R_3$ and $R_4$ to form a ring containing the amine nitrogen, and wherein $Z_4$ is a radical of the formula

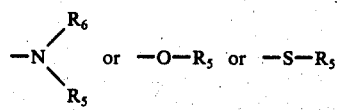

wherein $R_5$ and $R_6$ each denote hydrogen or aryl, aralkyl or cycloalkyl radicals or an aliphatic radical, and $R_5$ and $R_6$ can be linked to form a heterocyclic structure containing the amine nitrogen, and, in particular, dyestuffs in which M is a methyl group.

Aryl, aralkyl and cycloalkyl radicals and aliphatic radicals are preferably understood as radicals of the benzene series, benzyl, phenethyl and cyclohexyl radicals or alkyl radicals with at most 12 C atoms, it being possible for the latter to be interrupted by oxygen or sulphur atoms or by imino groups. The radicals R which are located on the same nitrogen atom can be linked together direct or via hetero-atoms, especially oxygen and sulphur, that is to say it is possible to link R' with R", $R_1$ with $R_2$, $R_3$ with $R_4$ and, in particular, $R_5$ with $R_6$. The radical $Z_4$ can thus be, for example, a piperidine, pyrrolidine or morpholine radical.

The radical M is a hydrogen atom or an ethyl, n-propyl or iso-propyl, butyl, pentyl, phenyl or methyl group, and preferably a methyl group.

Examples of possible radicals R', R", $R_1$, $R_2$, $R_3$, $R_4$, $R_5$ and $R_6$ are alkyl groups with 1 to 10 C atoms, such as, for example, methyl, ethyl, propyl, isopropyl, butyl, sec.-butyl, n-pentyl, hexyl, allyl, β-ethylhexyl and octyl radicals, which can be interrupted by oxygen atoms and can be substituted by hydroxyl groups, carboxyl groups, carbalkoxy groups (with 2 to 10 carbon atoms), alkoxy groups (with 1 to 8 carbon atoms), phenoxy groups, pyrrolidonyl groups, acyloxy groups (with 1 to 10 carbon atoms), phenyl groups which are optionally substituted by halogen atoms (preferably chlorine or bromine) or lower alkyl or lower alkoxy, β-hydroxyethyl, cyano, alkanoylamino(1-5 C) or lower carboalkoxy groups, or benzyl or phenethyl groups or cycloalkyl groups, or are linked together to form a piperidine, pyrrolidine, morpholine, piperazine or methylpiperazine ring.

Examples of suitable groups containing hydroxyl groups are β-hydroxyethyl or β-hydroxypropyl, γ-hydroxypropyl, β,γ-dihydroxypropyl and ω-hydroxyhexyl as well as the radicals of the formulae

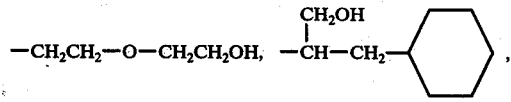

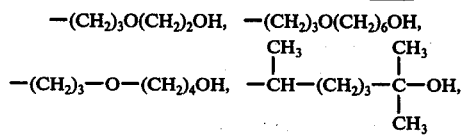

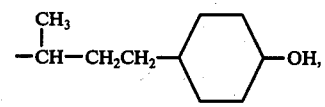

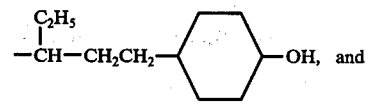

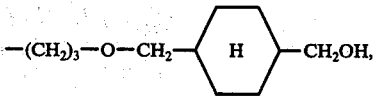

the alkoxyalkyl radicals β-methoxyethyl, γ-methoxypropyl, γ-iso-propoxypropyl, Y-butoxypropyl, β-ethoxyethyl and γ-ethoxypropyl, as well as the radicals of the formulae —(CH$_2$)$_3$OCH$_2$—⟨H⟩—CH$_2$OH or —(CH$_2$)$_3$O—⟨H⟩,

—(CH$_2$)$_3$OC$_2$H$_4$—OCH$_3$, —(CH$_2$)$_3$OC$_2$H$_4$OC$_2$H$_5$,

—(CH$_2$)$_3$OC$_2$H$_4$—OCH(CH$_3$)$_2$,

—(CH$_2$)$_3$OC$_2$H$_4$OC$_4$H$_9$, —(CH$_2$)$_3$OC$_2$H$_4$OC$_6$H$_5$,

—(CH$_2$)$_3$OC$_2$H$_4$OCH$_2$C$_6$H$_5$, —(CH$_2$)$_3$OC$_2$H$_4$OC$_2$H$_4$C$_6$H$_5$,

—(CH$_2$)$_3$OCH—CH$_2$—OC$_6$H$_5$, —(CH$_2$)$_3$OCHCH$_2$OCH$_3$,
$\quad\quad\quad\quad\quad$|$\quad\quad\quad\quad\quad\quad\quad\quad\quad\quad\quad\quad\quad\quad$|
$\quad\quad\quad\quad\quad$CH$_3\quad\quad\quad\quad\quad\quad\quad\quad\quad\quad\quad\quad\quad\quad$CH$_3$ —(CH$_2$)$_3$OCH—CH$_2$—OC$_4$H$_9$,
$\quad\quad\quad\quad\quad$|
$\quad\quad\quad\quad\quad$CH$_3$ —(CH$_2$)$_3$—OCH—CH$_2$—OCH$_2$C$_6$H$_5$, and
$\quad\quad\quad\quad\quad\quad$|
$\quad\quad\quad\quad\quad\quad$CH$_3$ —(CH$_2$)$_3$—O—CH$_2$—CH—(CH$_2$)$_3$—CH$_3$,
$\quad\quad\quad\quad\quad\quad\quad\quad\quad\quad$|
$\quad\quad\quad\quad\quad\quad\quad\quad\quad\quad$C$_2$H$_5$ $\quad\quad\quad\quad\quad\quad\quad\quad$CH$_3$
$\quad\quad\quad\quad\quad\quad\quad\quad$|
—(CH$_2$)$_3$—OCH$_2$CH—OC$_6$H$_5$ as well as the corresponding compounds in which two, three or four groupings —OC$_2$H$_4$—, —OCH$_2$—CH$_2$— or —OCH$_2$CH—
$\quad\quad\quad\quad\quad\quad\quad\quad$|$\quad\quad\quad\quad\quad\quad\quad\quad\quad$|
$\quad\quad\quad\quad\quad\quad\quad\quad$CH$_3\quad\quad\quad\quad\quad\quad\quad\quad$CH$_3$ are present, and compounds in which C$_6$H$_5$ is replaced by C$_6$H$_4$CH$_3$.

Further radicals to be mentioned are:

—(CH$_2$)$_3$OC$_6$H$_5$, —(CH$_2$)$_3$OCH$_2$C$_6$H$_5$, —(CH$_2$)$_3$OC$_2$H$_4$C$_6$H$_5$,

—CH$_2$CH—OC$_6$H$_5$, —CH—CH$_2$—OC$_6$H$_5$,
$\quad\quad$|$\quad\quad\quad\quad\quad\quad\quad$|
$\quad\quad$CH$_3\quad\quad\quad\quad\quad\quad$CH$_3$ —CHCH$_2$OCH$_3$, CHCH$_2$OC$_4$H$_9$,
$\quad$|$\quad\quad\quad\quad\quad\quad\quad$|
$\quad$CH$_3\quad\quad\quad\quad\quad\quad$CH$_3$ —CHCH$_2$OCH$_2$C$_6$H$_5$, —CH$_2$CHOCH$_3$,
$\quad$|$\quad\quad\quad\quad\quad\quad\quad\quad\quad\quad$|
$\quad$CH$_3\quad\quad\quad\quad\quad\quad\quad\quad\quad$CH$_3$ —CH$_2$CH—OC$_2$H$_5$, —CH$_2$CH—OC$_4$H$_9$,
$\quad\quad\quad$|$\quad\quad\quad\quad\quad\quad\quad\quad\quad$|
$\quad\quad\quad$CH$_3\quad\quad\quad\quad\quad\quad\quad$CH$_3$ $\quad\quad$—CH$_2$—CH—OC$_2$H$_4$C$_6$H$_5$ or —C$_2$H$_4$OC$_6$H$_5$
$\quad\quad\quad\quad\quad\quad$|
$\quad\quad\quad\quad\quad\quad$CH$_3$ as well as the radicals which have -C$_6$H$_4$CH$_3$ in place of C$_6$H$_5$; the carboxyalkyl and carbalkoxyalkyl radicals of the formulae: CH$_2$COOY, CH$_2$-CH$_2$-COOY, (CH$_2$)$_5$-COOY or (CH$_2$)$_2$-O-CO-(CH$_2$)$_2$—COOY, in which Y is, for example, hydrogen, methyl, ethyl, propyl, benzyl, β-hydroxyethyl, ω-hydroxyhexyl, γ-hydroxybutyl, β-methoxyethyl, γ-methoxypropyl, γ-ethoxypropyl, β-phenoxyethyl or β-hydroxyethoxyethyl, a radical of the formula $\quad\quad$CH$_3$
$\quad\quad$|
—(CH$_2$)$_n$CH—C$_6$H$_5$, wherein n is 1 or 2, the acyloxyalkyl radicals of the formulae
—CH$_2$—CH$_2$—O-Acyl, —(CH$_2$)$_3$—O-Acyl, $\quad$CH$_3\quad\quad\quad\quad\quad\quad$CH$_3$
$\quad$|$\quad\quad\quad\quad\quad\quad\quad\quad$|
—CH—(CH$_2$)$_3$—O—C—O-Acyl,
$\quad\quad\quad\quad\quad\quad\quad\quad\quad$|
$\quad\quad\quad\quad\quad\quad\quad\quad\quad$CH$_3$ —CH$_2$—CH—O-Acyl, —(CH$_2$)$_6$—O-Acyl,
$\quad\quad\quad$|
$\quad\quad\quad$CH$_3$ —(CH$_2$)$_2$—O—(CH$_2$)$_2$—O-Acyl
or —(CH$_2$)$_3$—O—(CH$_2$)$_4$—O-Acyl in which "Acyl" represents one of the acyl groups listed below but in particular represents a radical of the formulae —CO—H, —CO—CH$_3$, —CO—CH$_2$Cl, —CO—CH(CH$_2$)$_3$—CH$_3$, —CO—CH$_2$—CO—CH$_3$,
$\quad\quad\quad$|
$\quad\quad\quad$C$_2$H$_5$

—CO—CH=CH$_2$, —CO—CH=CH—⟨⟩,

CO—CH=CH—COOH, CO—(CH$_2$)$_2$—COOH,

CO—(CH$_2$)$_2$—COOC$_2$H$_5$, CO—CH$_2$—O—⟨⟩,

CO—⟨⟩, CO—⟨H⟩, CO—CH$_2$—⟨⟩,

COOC$_2$H$_5$ or CO—NH—⟨⟩ the pyrrolidonylalkyl radicals of the formulae:

(CH$_2$)$_2$—N⟨⟩, (CH$_2$)$_3$—N⟨⟩,
$\quad\quad\quad\quad$O$\quad\quad\quad\quad\quad\quad\quad\quad$O (CH$_2$)$_4$—N⟨⟩ or (CH$_2$)$_6$—N⟨⟩,
$\quad\quad\quad\quad$O$\quad\quad\quad\quad\quad\quad\quad\quad$O CH$_2$CH—OC$_6$H$_5$, CH$_2$—⟨H⟩—CH$_2$OH,
$\quad$|
$\quad$CH$_3$
(CH$_2$)$_2$CN, (CH$_2$)$_5$CN, (CH$_2$)$_6$ or (CH$_2$)$_7$ON and optionally substituted cycloalkyl and polycycloalkyl radicals:

⟨H⟩, —⟨H⟩, —⟨H⟩,

—⟨H⟩, —⟨H⟩$_{OH}$, —⟨H⟩—O—CH$_2$CH$_2$OH

-continued

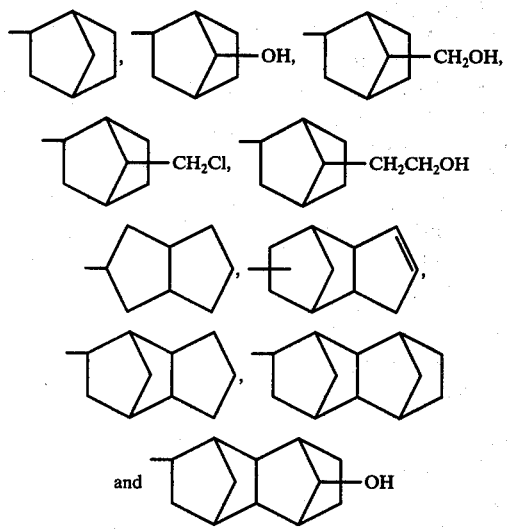

Aralkyl radicals of the formulae:

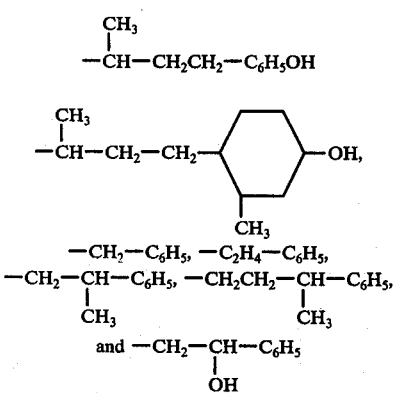

$-CH_2-C_6H_5$, $-C_2H_4-C_6H_5$,
$-CH_2-CH(CH_3)-C_6H_5$, $-CH_2CH_2-CH(CH_3)-C_6H_5$,
and $-CH_2-CH(OH)-C_6H_5$ as well as the corresponding toluene derivatives; and Optionally substituted phenyl radicals of the formulae:

$C_6H_5$, $C_6H_4Cl$, $C_6H_3Cl_2$, $C_6Cl_4CH_3$, $C_6H_3(CH_3)_2$, $C_6H_4CN$, $C_6H_4OCH_3$, $C_6H_4OC_2H_5$ or $C_6H_4NHCOCH_3$, $C_6H_4$-OH and $C_6H_4$-O-$C_2H_4$-OH.

Examples of radicals $R'$, $R''$, $R'''$, $R_1$, $R_2$, $R_3$, $R_4$, $R_5$ and $R_6$ which contain sulphonic acid groups are:

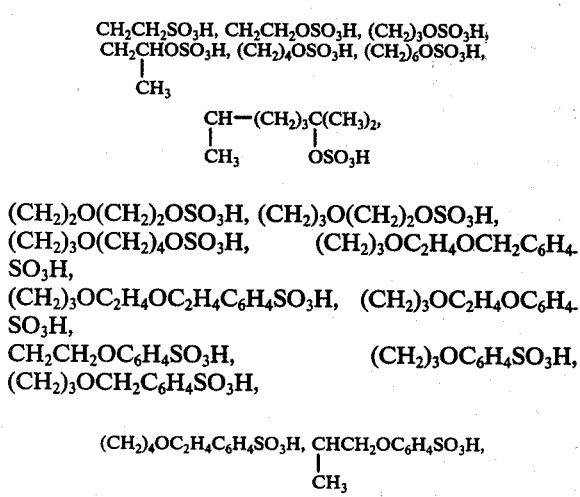

$(CH_2)_2O(CH_2)_2OSO_3H$, $(CH_2)_3O(CH_2)_2OSO_3H$,
$(CH_2)_3O(CH_2)_4OSO_3H$, $(CH_2)_3OC_2H_4OCH_2C_6H_4SO_3H$,
$(CH_2)_3OC_2H_4OC_2H_4C_6H_4SO_3H$, $(CH_2)_3OC_2H_4OC_6H_4SO_3H$,
$CH_2CH_2OC_6H_4SO_3H$, $(CH_2)_3OC_6H_4SO_3H$,
$(CH_2)_3OCH_2C_6H_4SO_3H$, $(CH_2)_4OC_2H_4C_6H_4SO_3H$, $CH(CH_3)CH_2OC_6H_4SO_3H$,

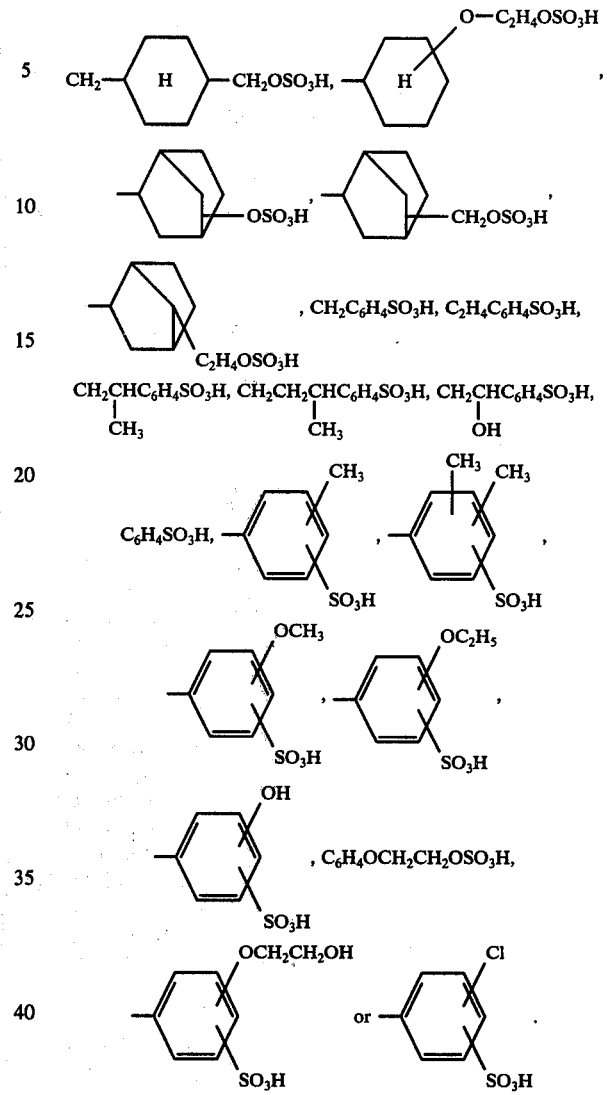

Possible acyl radicals are, for example, fatty acid radicals with up to 5 carbon atoms, such as formyl, acetyl, propionyl or butyl radicals, alkylcarbamyl radicals with up to 5 carbon atoms, such as methylaminocarbonyl, ethylaminocarbonyl, propylaminocarbonyl or butylaminocarbonyl radicals; alkoxycarbonyl radicals with up to 5 carbon atoms, such as methoxycarbonyl or ethoxycarbonyl, propoxycarbonyl or butoxycarbonyl radicals; phenylcarbamyl or phenoxycarbonyl radicals and benzoyl, phenoxyacetyl, chloroacetyl or phenylacetyl radicals.

Preferred dyestuffs are those of the indicated formula, in which D is a radical of the benzene series or a heterocyclic radical which contains sulphur and/or nitrogen, as well as dyestuffs in which $R_1$, $R_2$, $R_3$ and $R_4$ denote hydrogen.

According to the invention, the dyestuffs are manufactured by coupling a diazotised amine of the formula D-$NH_2$ with a coupling of the formulae

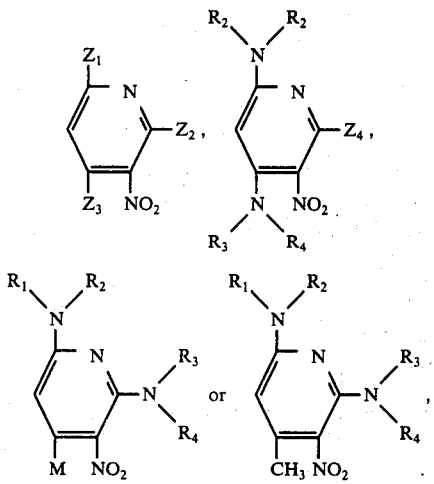

wherein M, D, $Z_1$, $Z_2$, $Z_3$, $Z_4$, $R_1$, $R_2$, $R_3$ and $R_4$ have the same meaning as above.

D preferably represents a phenyl radical which is optionally substituted by halogen atoms or hydroxyl, cyano, thiocyano, nitro, lower alkyl, trifluoromethyl, lower alkoxy, formyl, lower alkylcarbonyl, benzoyl, methylbenzoyl, lower alkoxycarbonyl, benzyloxycarbonyl, cyclohexylcarbonyl, phenoxycarbonyl, lower alkoxycarbonyloxy, benzyloxycarbonyloxy, lower alkylcarbonyloxy, benzoyloxy, lower alkylcarbonylamino, benzoylamino, lower alkylsulphonyl, chloroethylsulphonyl or hydroxyethylsulphonyl groups or by aminosulphonyl, di-(hydroxyethyl)-aminosulphonyl, phenylaminosulphonyl, chlorophenylaminosulphonyl or methoxyphenylaminosulphonyl, benzylaminosulphonyl, N-piperidylsulphonyl, N-morpholinosulphonyl, lower alkylsulphonyloxy, cyclohexylsulphonyloxy, chloromethylsulphonyloxy, cyanoethylsulphonyloxy, phenylsulphonyloxy, aminosulphonyloxy, chlorophenylsulphonyloxy or methoxyphenylsulphonyloxy, N-morpholinosulphonyloxy, ethyleneiminosulphonyloxy, lower monoalkyl- or dialkyl-aminosulphonyloxy, phenylaminosulphonyloxy, N-phenyl-N-(lower alkyl)-aminosulphonyloxy, N-(methoxy- or chloro-)-phenylaminosulphonyloxy, phenylamino, nitrophenylamino, dinitrophenylamino, phenyl, phenoxy and/or acetylaminophenyl groups, which are unsubstituted or monosubstituted or disubstituted by lower alkyl groups, a phenylazophenyl radical which is optionally substituted by chlorine or bromine atoms or by hydroxyl, cyano, nitro, lower alkyl, trifluoromethyl, lower alkoxy or phenoxy groups, a naphthyl radical which is optionally substituted by methoxy, ethoxy, phenylazo or dimethylaminosulphonyl groups, a thiazolyl radical which is optionally substituted by chlorine or bromine atoms or by nitro, cyano, thiocyano, lower alkyl, lower alkoxy, lower alkylmercapto, phenyl, benzyl, phenethyl, lower alkoxycarbonyl, trifluoromethyl, lower alkylcarbonyl and lower alkylsulphonyl groups, a benzthiazolyl radical which is optionally substituted by chlorine or bromine atoms or by cyano, thiocyano, nitro, lower alkyl, lower alkoxy, benzyl, phenylethyl, lower alkylsulphonyl, phenyl, lower alkylmercapto, lower alkoxycarbonyl, lower alkylcarbonyl, trifluoromethyl, cyanoethylsulphonyl or aminosulphonyl groups or optionally substituted by lower mono- or di-alkylaminosulphonyl groups, a pyrazolyl radical which is optionally substituted by cyano, lower alkyl, lower alkoxy, lower alkoxycarbonyl or phenyl groups, a thiadiazolyl radical which is optionally substituted by lower alkoxy, lower alkyl, phenyl, lower alkylsulphonyl or lower alkylmercapto groups, an imidazolyl radical which is optionally substituted by nitro or lower alkyl groups, a thienyl radical which is optionally substituted by nitro, lower alkyl, lower alkylsulphonyl, lower alkoxycarbonyl or acetyl groups, an isothiazolyl radical which is optionally substituted by lower alkyl, nitro, lower alkylsulphonyl, lower alkoxycarbonyl, cyano or phenyl groups, and a benzisothiazolyl radical which is optionally substituted by lower alkyl groups, nitro groups or halogen atoms. Lower alkyl groups are, for example, methyl, ethyl, propyl, isopropyl and isobutyl radicals; alkoxy radicals are analogously restricted to 1 to 4 carbon atoms.

Preferably, the diazo radical D is derived from amines which contain a heterocyclic 5-membered ring with 2 or 3 hetero-atoms, the hetero-atoms above all being one nitrogen atom and one or two sulphur, oxygen or nitrogen atoms, and from aminobenzenes, above all negatively substituted aminobenzenes in which the substituents have positive sigma values according to the Hammet equation, especially those of the formula

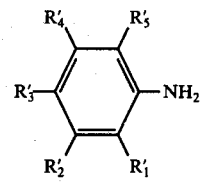

$R_1'$ is hydrogen, bromine or a thiocyano, alkylsulphonyl, alkoxycarbonyl, hydroxyl, alkylmercapto, arylmercapto, alkoxycarbonyloxy, aminosulphonyloxy or acylamino group or, preferably, chlorine or a nitro, cyano, acyl, sulphonamide, carboxylic acid amide, alkoxy or aryloxy group.

$R_2'$ is hydrogen, bromine or a carboxylic acid amide group, or preferably an alkoxycarbonyl or aminosulphonyloxy group.

$R_3'$ is hydrogen, bromine or a thiocyano, alkoxycarbonyl, alkoxy, aryloxy or acylamino group or, preferably, chlorine or a nitro, cyano, acyl, sulphonamide, carboxylic acid amide or trifluoromethyl group or a phenylazo group in which the phenyl nucleus can, in turn, be substituted by alkyl, alkoxy or nitro groups and chlorine.

$R_4'$ is hydrogen, bromine or a nitro, cyano, thiocyano, acyl, carboxylic acid amide, alkoxy, aryloxy or acylamino group or, preferably, chlorine or a sulphonamide, alkoxycarbonyl, trifluoromethyl or alkyl group.

$R_5'$ is, in particular, hydrogen, chlorine or bromine or a nitro, cyano, thiocyano, acyl, alkoxycarbonyl, trifluoromethyl or alkyl group.

Examples of such acyl radicals are: benzoyl and 4-chlorobenzoyl, 4-methylbenzoyl, benzenesulphonyl, formyl, acetyl, propionyl, chloroacetyl, methylsulphonyl, or methoxycarbonyl, ethoxycarbonyl, propoxycarbonyl or butoxycarbonyl radicals.

Amongst the diazo components of the benzene series which can be used, examples which may be mentioned are the following: aniline, 1-amino-3- or -4-chlorobenzene, 1-amino-4-bromobenzene, 1-amino-2-, -3- or -4-methylbenzene, 1-amino-2-, -3- or -4-nitrobenzene, 1-amino-4-cyanobenzene, 1-aminobenzene-3- or -4-methylsulphone, 1-amino-2-chlorobenzene-4-methylsulphone, 1-amino-2,5-dicyanobenzene, 1-amino-4-carbethoxybenzene, 1-amino-2,4- or 2,5-dichlorobenzene, 1-amino-2,4-dibromobenzene, 1-amino-2-methyl-4- or -6-chlorobenzene, 4-aminodiphenyl, 2- or 4-aminodiphenyl ether, 3- or 4-aminophthalimide, 1-amino-2-trifluoromethyl-4-chlorobenzene, 1-amino-2-cyano-4-chlorobenzene, 1-amino-2-carbomethoxy-4-chlorobenzene, 1-amino-2-methylsulphonyl-4-chlorobenzene, 1-amino-2-carbomethoxy-4-nitrobenzene, 1-amino-2-phenoxy-4-nitrobenzene, 1-amino-2-chloro-4-cyanobenzene, 1-amino-2-chloro-4-nitrobenzene, 1-amino-2-methoxy-4-nitrobenzene, 1-amino-2-chloro-4-carbethoxybenzene, 1-amino-2-bromo-4-carbohexoxybenzene, 1-amino-2,4-dinitrobenzene, 1-amino-2,4-dicyanobenzene, 1-amino-2,6-dichloro-4-cyanobenzene, 1-amino-2,6-dichloro-4-nitrobenzene, 1-amino-2,5-dichloro-4-nitrobenzene, 1-amino-2,5- or -2,6-dichlorobenzene-4-sulphonic acid dimethylamide, 1-aminobenzene-4-sulphonic acid β-chloroethylamide, 1-amino-2-chlorobenzene-4-sulphonic acid dimethylamide, 1-amino-2,6-dibromobenzene-4-sulphonic acid amide, 1-amino-2,4-dinitro-6-chloro- or -6-bromo-benzene, 1-amino-2,4-dicyano-6-chlorobenzene, 1-amino-5-chloro-4-cyano-2-nitrobenzene, 1-amino-2,4,6-trichloro- or -tribromo-benzene, 1-aminobenzene-3- or -4-sulphonic acid amide, 1-aminobenzene-3- or -4-sulphonic acid N-methylamide or N-diethylamide, 1-amino-2-nitrobenzene-4-sulphonic acid dimethylamide, 1-amino-2-nitrobenzene-4-ethylsulphone, 1-amino-4-nitrobenzene-2-methylsulphone, 1-aminobenzene-4-carboxylic acid methoxyethyl ester, 1-amino-2-nitrobenzene-4-carboxylic acid ethoxyethyl ester, 1-amino-2-cyano-4-nitrobenzene, 1-amino-2-cyano-4-nitro-6-bromobenzene, 1-amino-2,6-dicyano-4-nitrobenzene, 1-amino-2-cyano-4,6-dinitrobenzene and 1-amino-2,4,5-trichlorobenzene.

Aminoazobenzenes which can be used are the compounds of the formula

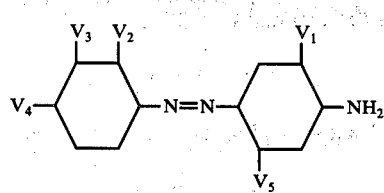

wherein $V_1$ is a hydrogen atom, a halogen atom or a methyl, a methoxy or ethoxy or a nitro group, $V_2$ is a hydrogen atom, a halogen atom or a nitro group, $V_3$ is a hydrogen atom, a halogen atom or a nitro group, $V_4$ is a hydrogen atom, a halogen atom, a methoxy group, an ethoxy group, an alkoxycarbonyl, a cyano or a nitro group and $V_5$ is a hydrogen atom, a halogen atom, a methyl or a methoxy group.

Suitable diazo components of the azobenzene series are, for example, 4-amino-azobenzene, 4-amino-2'-chloro-azobenzene, 4-amino-2',4'-dichloro-azobenzene, 4-amino-3'-chloro-azobenzene, 4-amino-2'-nitro-azobenzene, 4-amino-3-nitro-azobenzene, 4-amino-3'-nitro-azobenzene, 4-amino-2-methyl-azobenzene, 4-amino-4'-methoxy-azobenzene, 4-amino-3-nitro-2'-chloro-azobenzene, 4-amino-3-nitro-4'-chloro-azobenzene, 4-amino-3-nitro-2',4'-dichloro-azobenzene, 4-amino-3-nitro-4'-methoxyazobenzene, 4-aminoazobenzene-4'-sulphonic acid dimethylamide and 4-amino-2-methylazobenzene-4'-carboxylic acid ethyl ester.

However, any desired heterocyclic amines which can be diazotised and which contain no acid substituents conferring solubility in water can also be used as diazo components. These amines come, for example, from the thiazole, benzthiazole, naphthothiazole, isothiazole, benzthiazole, thiophene, imidazole, benzimidazole, thiadiazole, pyridine, quinoline, indazole, selenazole, oxazole, oxadiazole, benzoxazole, pyrazole or triazole series.

Possible substituents of these amines are: phenyl and phenylazo groups, in which the phenyl rings can also carry further substituents such as chlorine, nitro or alkyl, alkoxy and alkylmercapto radicals, each with 1 to 4 C atoms, and halogen, especially bromine and chlorine, sulphamoyl, trifluoromethyl, cyano, thiocyano, nitro, aralkyl, especially benzyl, and cycloalkyl, especially cyclohexyl, radicals, as well as alkyl, alkoxy, alkylmercapto, alkylsulphonyl, alkoxycarbonyl, alkanoyl and N,N-dialkylsulphonamide groups, especially those radicals with 1-4 C atoms.

Preferred amines are those which contain a heterocyclic five-membered ring with 2 or 3 hetero-atoms, the hetero-atoms above all being one nitrogen atom and one or two sulphur, oxygen or nitrogen atoms, that is to say, in particular, the amines of the thiazole, benzthiazole, isothiazole, benzisothiazole and thiadiazole series.

Preferred substituents of these amines are: halogen, especially chlorine or bromine, nitro, cyano or trifluoromethyl radicals, alkyl and alkoxycarbonyl radicals each with 1 to 4 C atoms, phenyl radicals and the above-mentioned substituted phenyl radicals. Examples of such heterocyclic diazo components are: 2-aminothiazole, 2-amino-5-nitrothiazole, 2-amino-5-methylsulphonyl-thiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 5-amino-1-phenylpyrazole, 3-aminoindazole, 3-amino-2-methyl-5,7-dinitroindazole, 3-amino-1,2,4-triazole, 3-amino-1-(4'-methoxyphenyl)-pyrazole, 5-(methyl-, -ethyl-, -phenyl- or -benzyl)-1,2,4-triazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-nitrobenzthiazole, 2-amino-6-carboethoxybenzthiazole, 2-amino-6-methylsulphonylbenzthiazole, 2-amino-1,3,4-thiadiazole, 2-amino-1,3,5-thiadiazole, 2-amino-4-phenyl- or -4-methyl-1,3,5-thiadiazole, 2-amino-4-methylthio-1,3,5-thiadiazole, 2-amino-5-phenyl-1,3,4-thiadiazole, 2-amino-3-nitro-5-methylsulphonylthiophene, 2-amino-3-nitro-5-acetylthiophene, 2-amino-3,5-bis-(methylsulphonyl)-thiophene, 5-amino-3-methyl-4-nitroisothiazole, 3-amino-5-nitro-2,1-benzisothiazole, 3-amino-7-bromo-5-nitro-2,1-benzisothiazole, 5-amino-4-nitro-1-methylimidazole, 4-amino-5-bromo-7-nitrobenzisothiazole and 4-amino-7-nitrobenztriazole.

The coupling component is a 3-nitro-2,6-diaminopyridine. These compounds can be manufactured by reacting 3-nitro-2,6-dichloropyridines with a primary or secondary amine or a hydroxy or mercapto compound.

Examples of amines which may be mentioned are: naphthylamine, aniline and its derivatives, such as 1-amino-3-chlorobenzene, 1-amino-4-carbethoxybenzene, 1-amino-2,4-dicyanobenzene, 1-amino-2-methoxy-4-nitrobenzene, 1-amino-2-methanesulphonyl-4-chlorobenzene, methylaminobenzene, ethylaminobenzene and 1-methylamino-3-chlorobenzene, and primary and secondary aliphatic amines, such as methylamine, ethylamine, isopropylamine, hexylamine, octylamine, decylamine, methoxyethylamine, isopropoxypropylamine, dimethylamine, diethylamine, chloroethylamine, ethanolamine, diethanolamine, propanolamine, benzylamine or cyclohexylamine, and morpholine, pyrrolidine and piperidine.

Examples of alcohols which may be mentioned are: ethanol, propanol, isopropanol, butanol, 2-ethoxyethanol, cyclohexanol, benzyl alcohol and phenol and its substituted derivatives.

Examples of mercapto compounds are ethylmercaptan and thiophenol.

Preferred coupling components are those 3-nitro-2,6-diaminopyridines which carry an amino group, especially a morpholino, pyrrolidino, or piperidino group, in the 2-position.

The starting materials, in particular the 3-nitrodiaminopyridines, are described, for example, in British Pat. No. 1,184,848.

In place of a single diazo component it is also possible to use a mixture of two or more of the diazo components according to the invention and in place of a single azo component it is possible to use a mixture of two or more of the azo components according to the invention.

The diazotisation of the diazo components mentioned can be carried out according to methods which are in themselves known, for example with the aid of a mineral acid, especially hydrochloric acid, and sodium nitrite or, for example, with a solution of nitrosylsulphuric acid in concentrated sulphuric acid.

The coupling can also be carried out in a manner which is in itself known, for example in a neutral to acid medium and if appropriate in the presence of sodium acetate or similar buffer substances or catalysts, which influence the rate of coupling, such as, for example, pyridine or its salts.

A particular embodiment of the invention comprises dyestuffs which are free from acid groups and wherein at least one radical Z and/or D contains one or more basic, optionally cationic groups, and in particular those dyestuffs of the formula

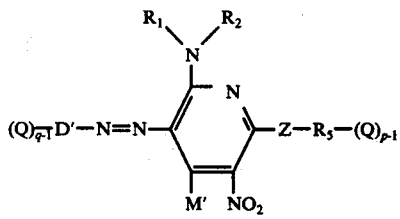

wherein D' is the radical of an aromatic or heterocyclic diazo component, M' is the radical $-NR_3R_4$ or is the same as M and $R_1$, $R_2$, $R_3$, $R_4$ and $R_5$ each denote hydrogen or an aryl, aralkyl or cycloalkyl radical or an aliphatic radical, it being possible for $R_1$ and $R_2$ and for $R_3$ and $R_4$ to form a ring containing the amine nitrogen, and the Q each denote an optionally quaternised amino, hydrazino, etherified hydroxylamino or pyridine grouping which is bonded direct or via a bridge, and $p$ and $q$ each denote 1 or 2 and, when $p$ and $q$ are both 1, D' is a heterocyclic structure with a quaternised ring nitrogen atom, and wherein Z is an oxygen or sulphur atom or an imino group of the formula

wherein $R_6$ is hydrogen, aryl, aralkyl, cycloalkyl or an aliphatic radical, which can be linked to $R_5$ or to Q. The basic radical Q can also be bonded direct to the aromatic or heterocyclic nucleus of the diazo component. However, it can also be located on a substituent, for example an alkyl or alkoxy group of the diazo component, or linked to the dyestuff molecule via an alkylenecarbonyl, carbonyloxy, carbonylamino, alkylenecarbonyloxy, alkylcarbonylamino, alkylsulphonylamino or alkylenesulphonyl bridge. The basic group Q can also, conjointly with $R_5$ and Z, form a ring, for example a piperazine radical.

Preferred dyestuffs are those of the indicated formula in which D is a radical of the benzene series or a heterocyclic radical which contains sulphur and/or nitrogen, as well as dyestuffs in which $R_1$, $R_2$, $R_3$ and $R_4$ denote hydrogen.

According to the invention, the basic dyestuffs are manufactured by coupling, condensation and quaternisation, coupling also comprising oxidative coupling.

For manufacture by coupling, the starting materials used are diazo components and coupling components, at least one component of which already contains a basic group. These basic groups are generally introduced prior to the coupling, by reacting an appropriate coupling component or diazo component, which possesses a reactive atom or a reactive group in place of the basic group, with amines, etherified hydroxylamines, hydrazines, pyridinecarboxylic acid chlorides or aminocarboxylic acid chlorides. Possible reactive groups are the same as are discussed further below in connection with manufacture by condensation. Thus, diazotised amines of the formula $D-NH_2$ or

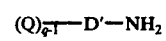

are coupled with coupling components of the formula

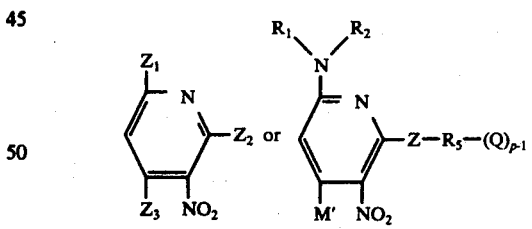

respectively, in which D, Y, $Z_1$, $Z_2$, $Z_3$, D', $R_1$, $R_2$, $R_3$, $R_4$, $R_5$, Z, $q$, $p$ and Q have the abovementioned meanings and, if necessary, when Y is CN, the cyano group is converted to the -$CONH_2$ group by using concentrated sulphuric acid.

Possible basic groups Q are, for example, those of the formula

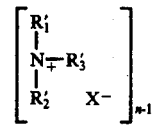

wherein $R_1'$ and $R_2'$ denote hydrogen or an alkyl radical, Especially with 1 - 4 C atoms, an aralkyl radical, especially a benzyl radical, or a cycloalkyl radical, especially a cyclohexyl radical, and $R_3'$ denotes hydrogen or an alkyl, aralkyl, cycloalkyl or alkoxy radical or an amino group and wherein the nitrogen atom, conjointly with $R_1'$ and/or $R_2'$ and/or $R_3'$, can form part of the heterocyclic ring. X is an anion and $n$ is 1 or 2. These radicals can be derived, for example, from the amines, hydroxylamines and hydrazines mentioned further below in connection with the manufacture of the dyestuffs by condensation. The anions can be those of strong inorganic acids, for example chloride, bromide, iodide, nitrate, sulphate, especially bisulphate, and phosphate, especially dihydrogen phosphate. However, anions of organic acids are also possible and these are understood as arylsulphonates, arylcarbonates, alkylsulphonates and alkylcarbonates, especially benzenesulphonate and its derivatives substituted by nitro, chlorine, bromine, $C_1$ to $C_4$ alkyl groups and $C_1 - C_4$ alkoxy groups, $C_1 - C_4$ alkylsulphonates, anions of aliphatic carboxylic acid with 1 to 4 C atoms and benzoates, it being possible for the benzene ring to carry the same substituents as in the case of the benzenesulphonates. The anions of low-molecular alkylsulphuric acid half-esters, that is to say those containing 1 to 4 C atoms, are particularly important. In addition, the dyestuffs can be present as double salts with heavy metal halides, especially with zinc halides and cadmium halides.

Examples of such anions are: benzenesulphonate, p-toluenesulphonate, p-methoxybenzenesulphonate, methanesulphonate, ethanesulphonate, formate, acetate, chloroacetate, propionate, lactate, tartrate, benzoate, methylbenzoate, methylsulphate, ethylsulphate, $ZnCl_3^-$, $CdCl_3^-$, carbonate and bicarbonate.

Preferred basic radicals are those of the indicated formula in which $R_1'$, $R_2'$ and $R_3'$ are low-molecular alkyl radicals, especially methyl radicals.

The basic groups can also be pyridine radicals

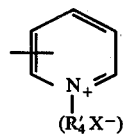

in which $R_4'$ is an alkyl radical, especially with 1 to 4 C atoms, a cycloalkyl radical, especially a cyclohexyl radical, or an aralkyl radical, especially a benzyl radical, and X has the same meaning as above.

The diazo components of the formula D—NH$_2$ and, respectively,

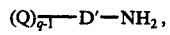

are derived, for example, from amines of the naphthalene series and especially from amines of the benzene series, such as have already been proposed above for the manufacture of disperse dyestuffs. The benzene nucleus can carry, in addition to the basic groups mentioned, the substituents already mentioned above in connection with the description of the disperse dyestuffs according to the invention.

Preferably, the diazo radical D is derived from amines which contain a heterocyclic five-membered ring with 2 or 3 hetero-atoms, the hetero-atoms above all being one nitrogen atom and one or two sulphur, oxygen or nitrogen atoms, and from aminobenzenes, above all negatively substituted aminobenzenes, in which the substituents have positive sigma values according to the Hammet equation, especially those of the formula

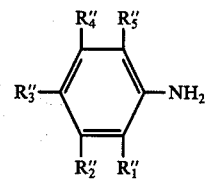

wherein $R_1''$, $R_2''$, $R_3''$, $R_4''$ and $R_5''$ have the above-mentioned meaning.

Diazo components which may be mentioned are, in addition to those of the benzene and the azobenzene series listed individually above, ethyl ethers of aminophenols, which contain one of the said basic groups Q in the β-position of the ethoxy radical and are derived, for example, from 4-nitro-2-aminophenol, 4,6-dinitro-2-aminophenol, 6-nitro-4-chloro-3-aminophenol, 4-nitro-3-aminophenol, 5-methanesulphonyl-2-aminophenol, 5-nitro-2-aminothiophenol and 4-chloro-2-aminophenol-5-sulphonic acid N-methylamide, the groups Q being, in particular, trimethylammonium chloride, triethylammonium chloride, pyridinium chloride, N-methylpiperidinium chloride and N-methylmorpholinium chloride, as well as the radicals of the amines, hydrazines and hydroxylamines mentioned further below in connection with the manufacture by condensation, and condensation products of phenacyl chloride or phenacyl bromide with the same amines, hydrazines and hydroxylamines, such as phenacyltrimethylammonium chloride and phenacyltriethylammonium chloride.

However, the diazo components can also be derived from any desired heterocyclic amines which can be diazotised and which have no acid groups conferring solubility in water. These amines come, for example, from the thiazole, benzthiazole, naphthothiazole, isothiazole, benzisothiazole, imidazole, benzimidazole, thiadiazole, pyridine, quinoline, indazole, thiophene, selenazole, oxazole, oxadiazole, benzoxazole, pyrazole or triazole series. The heterocyclic compounds containing nitrogen can be quaternised, possible anions being those mentioned in the description of the basic radicals.

Possible substituents of these amines, in addition to the basic groups Q, are: phenyl and phenylazo groups, in which the phenyl rings can also carry further substituents, such as chlorine, nitro radicals and alkyl, alkoxy and alkylmercapto radicals, each with 1 to 4 carbon atoms, and halogen, especially bromine and chlorine, sulphamoyl, trifluoromethyl, cyano, thiocyano and nitro radicals, aralkyl radicals, especially benzyl radicals, cycloalkyl radicals, especially cyclohexyl radicals, as well as alkyl, alkoxy, alkylmercapto, alkylsulphonyl, alkoxycarbonyl, alkanoyl and N,N-dialkylsulphonamide groups, especially those radicals with 1 to 4 carbon atoms.

It is also possible, by means of condensation before or after the coupling, as discussed further below, to introduce basic groups into those diazo components and coupling components which contain a reactive atom or a reactive group, for example chlorine, bromine or sulphonic acid ester, alkyl sulphate, hydroxyl or amino groups.

Components with quaternisable nitrogen atoms can be treated with quaternising agents before or after coupling.

When a dyestuff of the formula

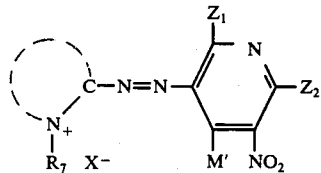

or of the formula

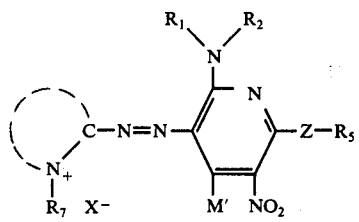

wherein X is an anion and $R_7$ is an alkyl, cycloalkyl or aralkyl radical, is to be manufactured, a hydrazone of the formula

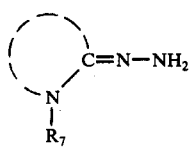

wherein $R_7$ has the same meaning as above, can be reacted with the abovementioned coupling components in the presence of oxidising agents.

When carrying out the manufacture by condensation, a dyestuff of the formula

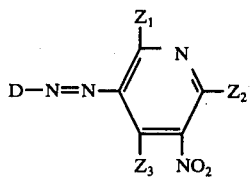

wherein D, $Z_1$, $Z_2$ and $Z_3$ have the abovementioned meaning but wherein at least one radical Z and/or D contains, in place of a basic group, a reactive atom or a reactive radical which can react with an amine, hydrazine, etherified hydroxylamine or a carboxylic acid halide, or a dyestuff of the formula

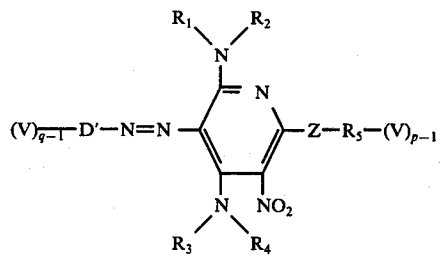

wherein D', $R_1$, $R_2$, $R_3$, $R_4$, $R_5$, Z, p and q have the indicated meaning, but $p + q$ must be at least 3, and V denotes a reactive atom or a reactive group, is reacted with an amine, hydrazine, etherified hydroxylamine, a pyridinecarboxylic acid chloride or an optionally quaternary aminocarboxylic acid chloride. Possible reactive atoms and groups are: halogen atoms, especially chlorine or bromine, benzenesulphonic acid ester groups, such as p-toluenesulphonates and benzenesulphonates, low-molecular alkylsulphonic acid ester groups and alkylsulphuric acid half-ester groups, that is to say those containing 1 to 4 C atoms, such as methyl sulphate and methanesulphonate, hydroxyl groups and amino groups.

Tertiary amines, hydrazines or hydroxylamines are preferably used for the condensation since cationic dyestuffs with quaternary nitrogen atoms are obtained direct in this way. When it is not subsequently exchanged, the anion of these dyestuffs corresponds to one of the reactive radicals V. The dyestuffs used for carrying out the manufacture by condensation are appropriately manufactured by coupling. The starting materials used for this purpose are compounds which correspond to the components used in the coupling process but which contain, in place of the basic groups, the indicated atoms or groups which can be split off.

The dyestuffs manufactured from these components by coupling are reacted, according to the invention, with pyridine or with optionally quaternary aminocarboxylic acid chlorides, amines, hydrazines or etherified hydroxylamines.

Examples of such compounds which may be mentioned are the following:

Amines: primary and secondary amines, such as methylamine, ethylamine, isopropylamine, methoxyethylamine, methoxypropylamine, dimethylamine, diethylamine, ethylphenylamine, diethanolamine, propanolamine, benzylamine, cyclohexylamine, pyrrolidine, piperidine, piperazine and morpholine, and tertiary amines such as trimethylamine, triethylamine, dimethylaniline, triethanolamine, pyridine, picoline, lutidine, N-methylpiperidine, N-methyl-piperazine, N-methylmorpholine, quinoline or pyrimidine;

hydrazines: N-methylhydrazine, N,N-dimethylhydrazine, N,N'-diethylhydrazine, N,N,N'-trimethylhydrazine, N,N,N',N'-tetramethylhydrazine, N-aminopiperidine, N-aminopyrrolidine and 1,5-diaza-bicyclo-[0.3.3]-octane;

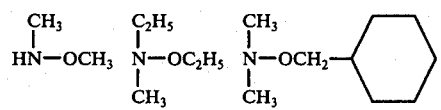

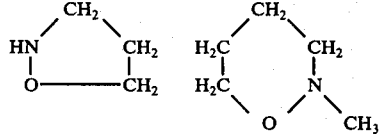

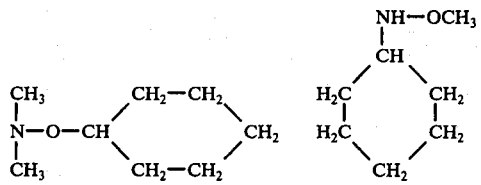

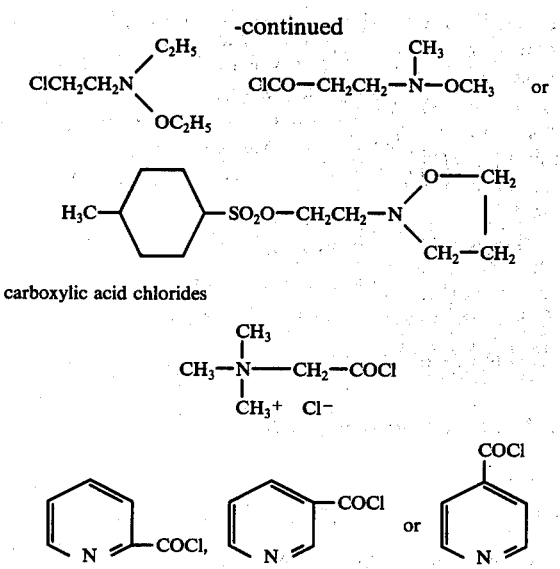

carboxylic acid chlorides

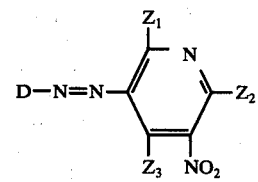

The reaction of the dyestuff, which, for example, contains a halogen or a sulphatoalkylgroup, with the amine, hydrazine or etherified hydroxylamine is carried out in a neutral solvent, for example in chlorobenzene, alcohols or aqueous alcohol mixtures or dimethylformamide, or without a solvent, appropriately at elevated temperature in an excess of the hydroxylamine and, if appropriate, with the addition of catalysts, for example NaI.

The acylation of dyestuffs, containing a hydroxyl or amino group which can be acylated, with the said carboxylic acid chlorides is preferably carried out in the presence of acid-binding agents, such as alkali metal acetates, bicarbonates and carbonates and alkaline earth metal acetates, bicarbonates and carbonates or pyridine, in an organic or organic-aqueous medium according to methods which are in themselves known.

According to a further manufacturing process variant, those new dyestuffs which contain a quaternised nitrogen atom can also be obtained by quaternising the corresponding dyestuffs, which contain a non-quaternised amino, hydrazino or etherified hydroxylamino group or a nitrogen-containing heterocyclic group, by treatment with alkylating agents, Examples of such alkylating or quaternising agents which can be used are: esters of strong mineral acids, especially low-molecular sulphuric acid esters, or of organic sulphonic acids, for example dimethyl sulphate, diethyl sulphate, alkyl halides, for example methyl chloride, methyl bromide or methyl iodide, aralkyl halides, for example benzyl chloride, esters of low-molecular alkanesulphonic acids, that is to say of those containing 1 to 4 C atoms, such as, for example, methyl esters of methanesulphonic acid, ethanesulphonic acid or butanesulphonic acid, and esters of benzenesulphonic acids which can contain additional substituents, for example methyl, ethyl, propyl or butyl esters of benzenesulphonic acid, of 2- or 4-methylbenzenesulphonic acid, of 4-chlorobenzenesulphonic acid or of 3- or 4-nitrobenzenesulphonic acid.

The alkylation is appropriately carried out by warming in an inert organic solvent, for example hydrocarbons, such as benzene, toluene or xylene, halogenated hydrocarbons, such as carbon tetrachloride, tetrachloroethane, chlorobenzene or o-dichlorobenzene, or nitrohydrocarbons, such as nitromethane, nitrobenzene or nitronaphthalene. Acid anhydrides, acid amides or nitriles, such as acetic anhydride, dimethylformamide or acetonitrile, or dimethylsulphoxide can also be used as solvents for the alkylation. It is also possible to use a large excess of alkylating agent in place of a solvent. In this case, however, care must be taken that the mixture does not heat up excessively, since the reaction is highly exothermic. Nevertheless, it is necessary in most cases, and in particular in the presence of organic solvents, to warm the reaction mixture from outside in order to start the reaction. In particular cases, the alkylation can also be carried out in an aqueous medium or using an alcohol, if necessary in the presence of small amounts of potassium iodide.

If it is necessary to purify the dyestuff salts, the purification is appropriately carried out by dissolving the salt in water, it being possible to filter off any unreacted starting dyestuff as an insoluble residue. The dyestuff can be separated out from the aqueous solution again by adding water-soluble salts, for example sodium chloride.

The resulting dyestuff salts can contain the anions introduced according to the process. However, these can also subsequently be replaced by other anions.

According to a further preferred embodiment, the dyestuffs of the formula $$D-N=N-\underset{Z_3\ NO_2}{\overset{Z_1}{\underset{}{\bigcirc}}}-Z_2$$

can also contain, when they are free from basic groups, acid substituents which confer solubility in water, especially sulphonic acid groups, in the groups $Z_1$, $Z_2$, $Z_3$, and/or D, which in other respects have the same meaning as above.

These water-soluble azo dyestuffs can contain one or more than one fibre-reactive radical, such as, for example, a halogenotriazine radical, in the molecule. In addition to being substituted by groups which confer solubility in water, such as, for example, sulphonic acid groups, carboxyl groups or quaternised amino groups, the azo dyestuffs can also be substituted, both in the radical of the diazo component and in the radical of the coupling component, in the customary manner by other atoms or groups of atoms, for example by halogen atoms or by hydroxyl, amino, alkyl, aryl, alkoxy, aryloxy, acylamino, cyano, acyl, carboalkoxy, acyloxy or nitro groups and the like. If the radical of the diazo component contains a complex-forming group, such as a hydroxyl, amino or carboxyl group, or an alkoxy group, such as, for example, a methoxy group, in the ortho-position relative to the azo bridge, the azo dyestuffs of the formula (1) can optionally be converted, before or after the introduction of fibre-reactive radicals, into their heavy metal complexes.

Examples of complex-forming metals which can be used are iron, manganese, nickel, copper, cobalt and chromium. The heavy metal complexes can contain one or two molecules of azo dyestuffs of the formula (1) bonded to a metal atom (1:1-complexes and 1:2-complexes respectively). However, in 1:2-complexes it is also possible for one of the two ligand molecules to be an azo dyestuff which does not correspond to the formula (1), that is to say, for example, a compound of the azobenzene type, which contains corresponding complex-forming groups.

Possible reactive radicals are the groupings capable of reaction with the hydroxyl groups of cellulose or with the amino groups of polyamides, with the formation of a covalent chemical bond.

Such a grouping is, in particular, a low molecular alkanoyl or alkylsulphonyl radical, which is substituted by an atom which can be split off or by a group which can be split off, a low molecular alkenoyl or alkenesulphonyl radical, which is optionally substituted by an atom which can be split off or by a group which can be split off, a carbocyclic or heterocyclic radical which contains 4, 5 or 6 rings is bonded via a carbonyl or sulphonyl group and is substituted by an atom which can be split off or by a group which can be split off, or a triazine or pyrimidine radical which is bonded direct via a carbon atom and is substituted by an atom which can be split off or by a group which can be split off, or contains such a radical.

Preferably, the reactive radical is a six-membered heterocyclic radical which contains halogen atoms and which is bonded via an amino group, such as a halogenotriazine or halogenopyrimidine radical or an aliphatic acyl radical.

In particular, the fibre-reactive radical is a radical of the formula $-N(R_1)-Z$, wherein $R_1$ is a low molecular alkyl radical or preferably a hydrogen atom and Z is a 4,6-dihalogeno-s-triazin-2-yl radical, a 4-halogeno-6-amino-(alkoxy, phenoxy, alkylmercapto or arymercapto)-s-triazin-2-yl radical or an $\alpha,\beta$-dibromopropionyl radical or an $\alpha$-bromoacryloyl radical. In this context low molecular alkyl radicals are to be understood as alkyl radicals with up to four carbon atoms, such as the methyl, ethyl, propyl, isopropyl or butyl radical.

The invention relates in particular to water-soluble azo dyestuffs of the formula

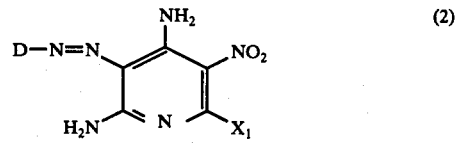 (2)

wherein D is the radical of a diazo component, $X_1$ is an amino, alkoxy, aryloxy, alkylmercapto, arylmercapto or aralkyloxy group or a heterocyclic radical and D and/or $X_1$ contain at least one sulphonic acid group.

A special group of water-soluble azo dyestuffs of the formula (2) are those of the formula

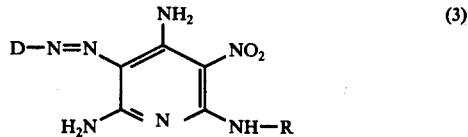 (3)

wherein D is a benzene or naphthalene radical which contains one or two sulphonic acid groups and optionally contains, as further substituents, low molecular alkyl or alkoxy groups, halogen atoms or hydroxyl, nitro, amino, carboxyl, acyl, acyloxy, acylamino, alkylsulphonyl, arylsulphonyl, aminosulphonyl, cyano or alkoxycarbonyl groups, and wherein R is a sulphoaryl radical.

Water-soluble azo dyestuffs of the formula (1), as well as their heavy metal complexes, which contain a fibre-reactive radical in the radical of the diazo component and/or in the radical of the coupling component are of particular interest.

Dyestuffs of this type which may above all be mentioned are:

1. Water-soluble azo dyestuffs of the formula

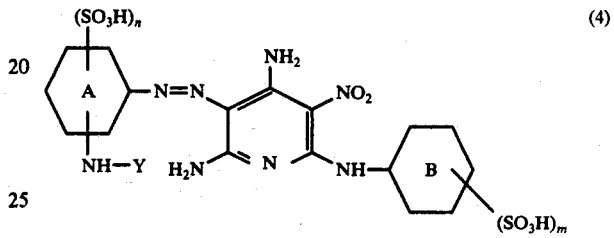 (4)

wherein Y is an aliphatic fibre-reactive acyl radical, n is 1 or 2, m is 0, 1 or 2 and the benzene ring A can be further substituted by halogen, low molecular alkyl or alkoxy, nitro or carboxyl and the benzene ring B can be further substituted by low molecular alkyl or alkoxy, nitro, carboxyl or acylamino, especially water-soluble azo dyestuffs of the formula (4), wherein Y is an $\alpha,\beta$-dibromopropionyl radical or an $\alpha$-bromoacryloyl radical and the benzene ring B optionally contains a further $\alpha,\beta$-dibromopropionylamino group or $\alpha$-bromoacryloylamino group; and 2. water-soluble azo dyestuffs of the formula (4), wherein Y is a heterocyclic fibre-reactive radical, n is 1 or 2, m is 0, 1 or 2 and the benzene ring A can be further substituted by halogen, low molecular alkyl or alkoxy, nitro or carboxyl and the benzene ring B can be further substituted by low molecular alkyl or alkoxy, nitro, carboxy or acylamino, especially water-soluble azo dyestuffs of the formula (4), wherein Y is a 4,6-dihalogeno-s-triazin-2-yl radical or a 4-halogeno-6-amino-(alkoxy, phenoxy or alkylmercapto)-s-triazin-2-yl radical and the benzene ring B optionally contains a further 4,6-dihalogeno-s-triazin-2-yl radical or 4-halogeno-6-amino-(alkoxy, phenoxy, alkylmercapto or arylmercapto)-s-triazin-2-yl radical.

Examples of water-soluble azo dyestuffs of the type mentioned are the dyestuffs of the formulae

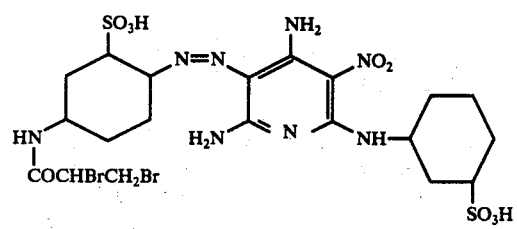

and

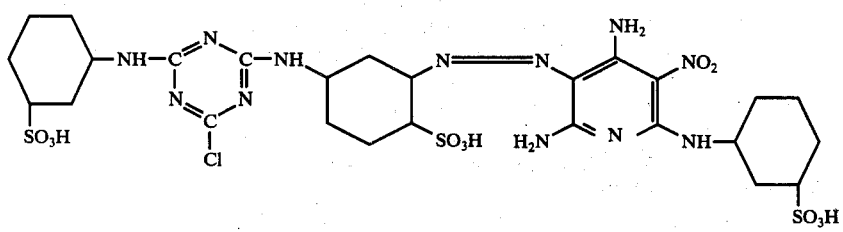

Further important compounds are water-soluble azo compounds of the formula (1) which contain a fibre-reactive radical both in the diazo component and in the coupling component, such as, for example, compounds of the formula (4) which, in addition to the reactive radical Y, contain a further reactive radical in the benzene radical B.

The invention also relates to a process for the manufacture of the water-soluble azo dyestuffs of the formula (1), which is characterised in that a diazo component of the formula

D—NH$_2$     (5)

wherein D has the meaning indicated in the explanation for formula (1), is coupled with a coupling component of the formula

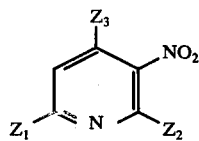  (6)

wherein $Z_1$ to $Z_3$ have the meanings indicated in the explanation for formula (1), and that the resulting azo dyestuff is optionally metallised with an agent which is a source of a heavy metal and/or acylated with an acylating agent.

A process which is characterised in that a diazo component of the formula

D—NH$_2$     (5)

wherein D has the abovementioned meaning, is coupled with a coupling component of the formula

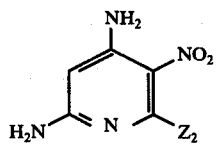  (7)

wherein $Z_2$ is an amino, alkoxy, aryloxy, alkylmercapto, arylmercapto or aralkyloxy group or a heterocyclic radical, D and/or $Z_2$ containing at least one sulphonic acid group, is preferred.

The radical of the diazo component D in formula (5) is preferably a benzene or naphthalene radical, which contains one or two sulphonic acid groups and optionally contains, as further substituents, low molecular alkyl or alkoxy groups, halogen atoms or hydroxyl, nitro, amino, carboxyl, acyl, acyloxy, acylamino, alkylsulphonyl, arylsulphonyl, aminosulphonyl, cyano or alkoxycarbonyl groups.

Preferred coupling components are coupling components of the formula

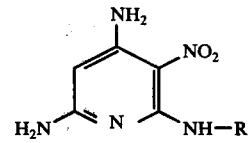  (8)

wherein R is a sulphoaryl radical.

In a preferred embodiment, diazo components and/or coupling components which contain fibre-reactive radicals are used as the starting material.

The particular water-soluble azo dyestuffs of the formula (1) are manufactured by coupling a diazo component of the formula

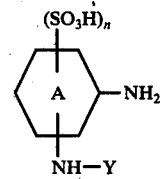  (9)

wherein Y is an aliphatic fibre-reactive acyl radical, n is 1 or 2 and the benzene ring A can be further substituted by halogen, low molecular alkyl or alkoxy, nitro or carboxyl, with a coupling component of the formula

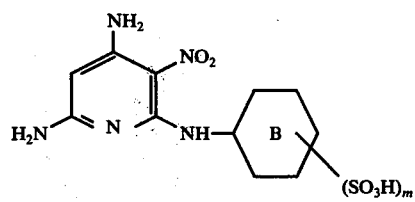  (10)

wherein m is 0, 1 or 2 and the benzene ring B can be further substituted by low molecular alkyl or alkoxy, nitro, carboxyl or acylamino.

The azo dyestuffs of the formula (4) can also be obtained by coupling a diazo component of the formula (9), wherein Y is a hydrogen atom or an acyl radical and n and A have the indicated meanings, with a coupling component of the formula (10), wherein n is 0, 1 or 2 and the benzene ring B can be further substituted by low molecular alkyl or alkoxy, nitro, carboxyl, acylamino or amino, and reacting the resulting azo dyestuff, if appropriate after splitting off the acyl radical Y by saponification, with an aliphatic fibre-reactive acylating agent in order to introduce one aliphatic fibre-reactive acyl radical or, if the benzene ring B contains an amino group which can be acylated, two aliphatic fibre-reactive acyl radicals.

α,β-Dibromopropionyl halide and α-bromoacryloyl halide are important aliphatic fibre-reactive acylating agents.

A process variant in which a diazo component of the formula (9), wherein Y is an α,β-dibromopropionyl radical or an α-bromoacryloyl radical and n and A have the indicated meanings, is coupled with a coupling component of the formula (10), wherein n and B have the abovementioned meanings and the benzene ring B optionally contains a further α,β-dibromopropionylamino group or α-bromoacryloylamino group, is also important.

The procedure employed in order to obtain the water-soluble azo dyestuffs of the formula (4) which contain a heterocyclic fibre-reactive radical, which are also important, is to couple a diazo component of the formula

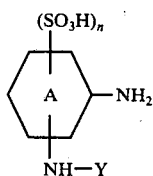

wherein Y is a heterocyclic fibre-reactive radical, n is 1 or 2 and the benzene ring A can be further substituted by halogen, low molecular alkyl or alkoxy, nitro or carboxyl, with a coupling component of the formula

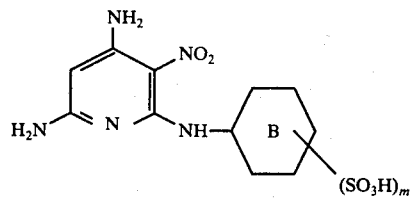

wherein m is 0, 1 or 2 and the benzene ring B can be further substituted by low molecular alkyl or alkoxy, nitro, carboxyl or acylamino, or to couple a diazo component of the formula (9), wherein Y is a hydrogen atom or an acyl radical and n and A have the abovementioned meanings, with a coupling component of the formula (10), wherein m is 0, 1 or 2 and the benzene ring B can be further substituted by low molecular alkyl or alkoxy, nitro, carboxyl, acylamino or amino, and to react the resulting azo dyestuff, if appropriate after splitting off the acyl radical Y by saponification, with a heterocyclic fibre-reactive acylating agent in order to introduce one heterocyclic fibre-reactive radical or, if the benzene ring B contains an amino group which can be acylated, two heterocyclic fibre-reactive radicals.

The heterocyclic fibre-reactive acylating agent which can be used is, in particular, a 2,4,6-trihalogeno-s-triazine or a 2,4-dihalogeno-6-amino-(alkoxy, phenoxy, alkylmercapto or arylmercapto)-s-triazine.

Further important fibre-reactive azo dyestuffs are obtained when a diazo component of the formula (9), wherein Y is a 4,6-dihalogeno-s-triazin-2-yl radical or a 4-halogeno-6-amino-(alkoxy, phenoxy, alkylmercapto or arylmercapto)-s-triazin-2-yl radical and n and A have the abovementioned meanings, is coupled with a coupling component of the formula (10), wherein m and B have the abovementioned meanings and the benzene ring B optionally contains a further 4,6-dihalogeno-s-triazin-2-yl-amino group or 4-halogeno-6-amino-(alkoxy, phenoxy, alkylmercapto or arylmercapto)-s-triazin-2-yl-amino group.

Those fibre-reactive azo dyestuffs which contain one or more monohalogeno-s-triazine radicals in the molecule are also obtained according to the manufacturing procedures described above by using a 2,4,6-trihalogeno-s-triazine as the heterocyclic fibre-reactive acylating agent or by using diazo components and/or coupling components which contain a 4,6-dihalogeno-s-triazin-2-yl radical and replacing a halogen atom in the azo dyestuff thus obtained, which contains one or two fibre-reactive 4,6-dihalogeno-3-triazin-2-yl radicals, by an amino, alkoxy, phenoxy, alkylmercapto or arylmercapto group by reaction with ammonia, an amine, alcohol, phenol or mercaptan.

Those water-soluble azo dyestuff which contain one or two α,β-dibromopropionyl radicals and which are obtained according to the process can be treated with agents which split off hydrogen halide, such as, for example, sodium hydroxide, in order to convert the α,β-dibromopropionyl radical or radicals into α-bromoacryloyl radicals.

Depending on the starting materials selected, it is also possible, according to the process methods described above, to manufacture bis-reactive dyestuffs of the formula (1) which contain two different fibre-reactive radicals, for example an α,β-dibromopropionyl radical and a 4,6-dichloro-s-triazin-2-yl radical.

The diazotisation is carried out according to methods which are in themselves known, for example with the aid of hydrochloric acid and sodium nitrite. The coupling with the aminopyridine is also carried out according to methods which are in themselves known, in an acid to weakly alkaline medium.

The reaction with the agent which is a source of a heavy metal is carried out according to customary processes and, depending on the solubility of the components, in various solvents, such as, for example, water, ethanol, formamide, glycol ethers, pyridine and the like, if appropriate at elevated temperature, in a weakly acid to alkaline medium.

The diazo compounds of the amines which follow may be mentioned as diazo components which can be used for the manufacture of the water-soluble azo compounds of the formula (1) and of the corresponding heavy-metal complexes: aminobenzene, 1-amino-4-chlorobenzene, 1-amino-4-bromobenzene, 1-amino-4-methylbenzene, 1-amino-2-nitrobenzene, 1-amino-4-nitrobenzene, 1-amino-4-cyanobenzene, 1-amino-2,5-dicyanobenzene, 1-amino-4-methylsulphonylbenzene, 1-amino-4-carbalkoxybenzene, 1-amino-2,4-dichloro-benzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carboethoxybenzene, 1-amino-2-chloro-4-methylsulphonylbenzene, 1-amino-2-hydroxybenzene, 1-amino-4-nitrobenzene-2-sulphonic acid, 1-aminobenzene-2,5-disulphonic acid, 1-aminobenzene-2,4-disulphonic acid, 1-amino-4-carboxybenzene-2-sulphonic acid, 1-aminobenzene-2-, -3- or -4-sulphonic acid, 1-amino-4-chlorobenzene-2-sulphonic acid, 1-amino-3-chloro-4-nitrobenzene-6-sulphonic acid, 1-amino-6-hydroxybenzene-3-sulphonic acid, 1-amino-4-methylbenzene-6-sulphonic acid, 1-amino-4-ethoxybenzene-6-sulphonic acid, 1-amino-4-chloroacetylaminobenzene-2-sulphonic acid, 1-amino-4-α,β-dibromopropionylaminobenzene-2-sulphonic acid, 1-amino-4-chloroacetylaminobenzene-2,5-disulphonic acid, 1-amino-5-(α-bromoacryloylamino)-benzene-2-sulphonic acid, 1-amino-4-(α,β-dibromopropionylamino)-5-methoxybenzene-2-sulphonic acid, 1-amino-4-(α,β-dibromopropionylamino)-5-methylbenzene-2-sulphonic acid, 1-amino-4-methyl-5-(α-bromoacryloylamino)-benzene-2-sulphonic acid, 1-amino-4-(α,β-dibromopropionylamino)-benzene-2,6-disulphonic acid, 1-aminonaphthalene, 2-aminonaphthalene, 1-aminonaphthalene-4-sulphonic acid, 2-amino-naphthalene-6-sulphonic acid, 2-aminonaphthalene-1-sulphonic acid, 2-aminonaphthalene-6,8-, -4,8- or -5,7-disulphonic acid, 2-aminonaphthalene-4,6,8-trisulphonic acid, 2-amino-8-hydroxynaphthalene-6-sulphonic acid, 3-amino-8-hydroxynaphthalene-6-sulphonic acid, 1-amino-8-hydroxynaphthalene-3,6- or -4,6-disulphonic acid, 3-, 5-, 6- or 8-amino-quinoline, 8-amino-quinoline-5-sulphonic acid, 2-amino-benz-1,3-thiazole, 2-amino-6-nitrobenz-1,3-thiazole, 2-amino-6-methoxybenz-1,3-thiazole, 2-aminothiophene, 3-aminoindole, 3-aminoindazole, 3-aminopyridine, 2-amino-1,3-thiazole, 3-aminopyrazole, 4-amino-3-methyl-1-phenyl-pyrazole, 5-amino-3-phenyl-1,2,4-thiadiazole, and 4- or 5-aminoimidazole.

The water-soluble azo compounds of the formula (1), and the corresponding heavy metal complexes, which contain one or more fibre-reactive groups can be manufactured by using diazo components or coupling components which already contain reactive groups. In many cases, however, it is also possible subsequently to introduce reactive groups into the azo compounds. The introduction can be effected after coupling or after metallisation.

The reactive radical is preferably introduced by acylating corresponding diazo components which, in addition to the amino group to be diazotised, also contain a further amino group which can be acylated or a group which can be converted, for example by reduction or saponification, into an amino group which can be acylated, such as, for example, the nitro group or acetylamino group.

Examples which may be mentioned of corresponding diazo components which are suitable for introducing a fibre-reactive radical are: 1,3-diaminobenzene-4-sulphonic acid, 1,3-diaminobenzene-4,6-disulphonic acid, 1,4-diaminobenzene-2-sulphonic acid, 1,4-diaminobenzene-2,5- or -2,6-disulphonic acid and 1,3-diamino-4-methylbenzene-6-sulphonic acid and the monoacetyl derivatives thereof, 1-amino-4-nitrobenzene, 1-amino-2-chloro-4-nitrobenzene, 6-acetylamino-4-chloro-2-aminophenol, 6-nitro-4-methyl-2-aminophenol, 4-nitro-2-aminophenol-6-sulphonic acid, 6-acetylamino-1-amino-2-naphthol-4-sulphonic acid and others, for example compounds already mentioned in the list of possible diazo components.

Examples of possible aminoazo compounds into which, after coupling, the fibre-reactive radicals can be introduced are the coupling products of the abovementioned diazo components with pyridines of the formula (6).

If the reactive radical contains yet further substituents which can be split off easily, for example halogen atoms, such as in the dichlorotriazine radical, this radical can be condensed with compounds which contain a reactive hydrogen atom which is bonded via a heteroatom and which is able to react with a removable substituent of the reactive radical, with the formation of a functional group which is bonded via the heteroatom. Thus, in particular, a chlorine atom in the dichlorotriazine radical can be exchanged, by reaction with ammonia, an amine, alcohol, phenol or mercaptan, for one of the corresponding radicals.

Instead of subsequently replacing a halogen atom in a dihalogenotriazine radical by an amino, alkoxy, aryloxy or mercapto group, it is also possible to use a dihalogenotriazine which already contains an amino, alkoxy, aryloxy or mercapto group bonded to the triazine ring as a fibre-reactive acylating agent.

Azo compounds of the formula (1), which possess a monohalogenotriazine radical which is bonded via an amino group and which contains, in addition to the halogen atom, an amino group bonded to the triazine ring, and in which a further fibre-reactive radical, especially a halogenotriazine radical, is bonded to this amino group, are also important. If the second, additional fibre-reactive radical is a halogenotriazine radical, it is preferably bonded to the first triazine radical via the radical of an alkylenediamine or arylenediamine. The fibre-reactive amino group which is present, in addition to the halogen atom, in the monohalogenotriazine radical thus preferably has the structure

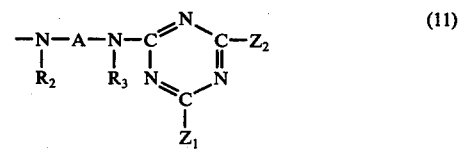 (11)

wherein $R_2$ and $R_3$ denote a hydrogen atom or a low molecular alkyl radical, A denotes an alkylene or arylene radical, $Z_1$ denotes a halogen atom, for example a fluorine, chlorine or bromine atom, and $Z_2$ denotes a halogen atom or an amino, alkoxy, aryloxy, alkylmercapto or arylmercapto group. In this case low molecular alkyl radicals are to be understood as alkyl radicals with 1 to 4 carbon atoms. A can be an alkylene radical with a relatively short or relatively long chain, for example an ethylene radical or a hexylene radical, but A is preferably a benzene radical, for example a m- or p-phenylene radical, especially a phenylenesulphonic acid radical.

Possible alkoxy groups are radicals of primary, secondary or tertiary alcohols, such as, for example, the methoxy, ethoxy, propoxy, isopropoxy, or 1,1-dimethylethoxy group, radicals of etherified dialcohols, such as, for example, the ethoxyethoxy or methoxypropoxy group, radicals of unsaturated aliphatic alcohols, such as, for example, the allyloxy or propargyloxy group, or radicals of aliphatic alcohols which contain cyclic groups, such as, for example, the benzyloxy, furfuryloxy or tetrahydrofurfuryloxy group. Aryloxy groups which may be mentioned are radicals of phenols and naphthols, especially the phenoxy, sulphophenoxy or disulphophenoxy group. Methylmercapto and phenylmercapto groups are to be mentioned as alkylmercapto or arylmercapto groups.

In a particular embodiment $Z_2$ is the same as the chromogenic radical of the compounds of the formula (1).

Possible acylating agents which contain a reactive radical are, in particular, the halides or anhydrides or organic acids which contain atoms or groups of atoms which can be exchanged easily.

The following may be mentioned as examples of acylating agents containing a fibre-reactive radical: cloroacetyl chloride or bromoacetyl chloride, β-chloropropionyl chloride or β-bromopropionyl chloride, α,β-dichloropropionyl chloride or α,β-dibromopropionyl chloride, chloromaleic acid anhydride, carbyl sulphate, acrylic chloride, 4,5-dichloro-1-phenylpyridazone-carboxylic or -sulphonic acid chloride, 4,5-dichloropyridazonepropionic acid chloride, 1,4-dichlorophthalazinecarboxylic or -sulphonic acid chloride, 2,3-dichloroquinoxalinecarboxylic or -sulphonic acid chloride, 2,4-dichloroquinazoline-carboxylic or -sulphonic acid chloride, 2-methanesulphonyl-4-chloro-6-methylpyrimidine, 2,4-bis-methanesulphonyl-6-methylpyrimidine, 2,4,6-tri- or 2,4,5,6-tetrachloropyrimidine, 2,4,6-tri- or 2,4,5,6-tetrabromopyrimidine, 2-methanesulphonyl-4,5-dichloro-6-methylpyrimidine, 2,4,6-trichloro-5-bromopyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro- (-tribromo- or -trifluoro) -1,3,5-triazines and also 4,6-dichloro- (-dibromo- or -difluoro)-1,3,5-triazines, which are substituted in the 2-position by an aryl or alkyl radical, for example a phenyl, methyl or ethyl radical, or by the radical of an aliphatic or aromatic mercapto compound, which is bonded via the sulphur atom, or of an aliphatic or aromatic hydroxy compound which is bonded via the oxygen atom, or especially by a $NH_2$ group or by the radical of an aliphatic, heterocyclic or aromatic amino compound which is bonded via the nitrogen atom.

The acylations with the fibre-reactive acylating agents and the condensations with compounds which contain a reactive hydrogen atom bonded via a heteroatom are appropriately carried out using acid-binding agents, such as sodium carbonate or sodium hydroxide, and under conditions such that exchangeable halogen atoms, unsaturated bonds or the like still remain in the fibre-reactive radical in the finished product, that is to say the reactions are carried out, for example, in organic solvents or at relatively low temperatures in an aqueous medium.

The new dyestuffs, which are free from groups conferring solubility in water, belong to the category of disperse dyestuffs, such as are described, for example, in the Colour Index. They are outstandingly suitable for dyeing and printing leather, wool, silk and, above all, synthetic fibres, such as, for example, acrylic fibres or acrylonitrile fibres, polyacrylonitrile fibres and copolymers of acrylonitrile and other vinyl compounds, such as acrylic esters, acrylamides, vinylpyridine, vinyl chloride or vinylidene chloride, copolymers of dicyanoethylene and vinyl acetate, as well as acrylonitrile block copolymers, fibres made of polyurethanes and polyolefines, such as base-modified, nickel-modified or unmodified polypropylene, polyamides, such as nylon 6, nylon 6,6 or nylon 12 and especially fibres made of cellulose triacetate and cellulose 2½- acetate and of aromatic polyesters, such as those of terephthalic acid and ethylene glycol or 1,4-dimethylcyclohexane and copolymers of terephthalic acid and isophthalic acid and ethylene glycol.

Preferably, the dyeing of the said fibre materials with the azo dyestuffs according to the invention, which are sparingly soluble in water, is carried out from an aqueous dispersion. When the dyestsuffs according to the invention contain hydrophilic groups, such as, for example, one or more hydroxyalkyl, carbonamide or sulphonamide groups, in the diazo component, they are best applied from a solvent liquor. It is therefore appropriate finely to divide compounds of this category, which can be used as disperse dyestuffs, by grinding with textile auxiliaries, such as, for example, dispersing agents and possibly with further grinding auxiliaries. Subsequent drying gives dyestuff formulations consisting of the textile auxiliary and the dyestuff.

Examples which may be mentioned of dispersing agents of the non-ionic group which can be used advantageously are: addition products of 8 mols of ethylene oxide with 1 mol of p-tert.-octylphenol, of 15 mols and, respectively, 6 mols of ethylene oxide with castor oil and of 20 mols of ethylene oxide with the alcohol $C_{16}H_{33}OH$, ethylene oxide addition products with di-[α-phenylethyl]-phenols, polyethylene oxide tert.-dodecyl thioether, polyamine-polyglycol ethers or addition products of 15 and, respectively, 30 mols of ethylene oxide with 1 mole of the amine $C_{12}H_{25}NH_2$ or $C_{18}H_{37}NH_2$.

Anionic dispersing agents which may be mentioned are: sulphuric acid esters of alcohols of the fatty series with 8 to 20 carbon atoms, of the ethylene oxide adducts of the corresponding fatty acid amides, or of alkylated phenols with 8 to 12 carbon atoms in the alkyl radical; sulphonic acid esters with alkyl radicals with 8 to 20 carbon atoms; sulphation products of unsaturated fats and oils; phosphoric acid esters with alkyl radicals with 8 to 20 carbon atoms; fatty acid soaps and also alkylarylsulphonates, condensation products of formaldehyde with naphthalenesulphonic acid and ligninsulphonates.

Suitable cationic dispersing agents are quaternary ammonium compounds which contain an alkyl or aralkyl radical with 8 to 20 carbon atoms.

In addition to the dispersing agents, the dyestuff formulations can also contain organic solvents, especially solvents which boil above 100° C and which preferably are miscible with water, such as mono- and di-alkylglycol ethers, dioxane, dimethylformamide or dimethylacetamide, tetramethylenesulphone or dimethylsulphoxide. Advantageously, the dyestuff, the dispersing agent and the solvent can be ground with one another.

Dyeing of polyester fibres with the dyestuffs according to the invention, which are sparingly soluble in water, from an aqueous dispersion is carried out according to the processes customary for polyester materials. Polyesters of aromatic polycarboxylic acids with polyhydric alcohols are preferably dyed at temperatures of above 100° C, under pressure. However, dyeing can also be carried out at the boiling point of the dye bath in the presence of dyestuff carriers, for example phenylphenols, polychlorobenzene compounds or similar auxiliaries, or by the thermosol process, that is to say padding with subsequent hot after-treatment, for example thermofixing at 180°–210° C. Cellulose 2½-acetate fibres are preferably dyed at temperatures of 80°–85° , whilst cellulose triacetate fibres are advantageously dyed at the boiling point of the dye bath. When dyeing cellulose 2½-acetate or polyamide fibres, it is not necessary to use dyestuff carriers. Dyestuffs according to the invention can also be used for printing the said materials according to customary methods.

The dyeings obtained according to the present process can be subjected to an after-treatment, for example by heating with an aqueous solution of a non-ionic washing agent.

According to the present process, the indicated compounds can also be applied by printing, instead of by impregnation. For this purpose, for example, a printing ink which contains the finely disperse dyestuff in addition to the auxiliaries customary in printing, such as wetting agents and thickeners, is used.

It is also possible to dye, for example, synthetic fibres, such as polyesters and polyamides, in organic solvent liquors, such as a mixture of perchloroethylene and dimethylformamide or in pure perchloroethylene.

The present process gives deep luminous dyeings and prints with excellent fastness properties, in particular fastness to light, thermofixing, sublimation, pleating, flue gas, cross-dyeing, drycleaning, ironing, rubbing, and chlorine and wet fastness properties, such as fastness to water, washing and perspiration.

The new dyestuffs, which are insoluble in water, can also be used for spin-dyeing polyamides, polyesters and polyolefins. The polymer to be dyed is appropriately mixed, in the form of a powder, granules or chips, as a ready-to-use spinning solution or in the molten state, with the dyestuff, which is introduced in the dry state or in the form of a dispersion or solution in an optionally volatile solvent. After homogeneous distribution of the dyestuff in the solution or melt of the polymer, the mixture is processed in a known manner by casting, pressing or extruding to give fibres, yarns, monofilaments, films and the like.

The basic dyestuffs and dyestuff salts, obtained according to the invention, which have an optionally quaternised amino, hydrazino or etherified hydroxylamino group or a nitrogen-containing heterocyclic group, are suitable for dyeing and printing very diverse fully synthetic fibres, such as, for example, polyvinyl chloride, polyamide and polyurethane fibres, as well as fibres of polyesters of aromatic dicarboxylic acids, such as, for example, polyethylene terephtalate, fibres, as well as anionically modified polyester and polyamide fibres, but especially polyacrylonitrile fibre materials or polyvinylidene cyanide fibres (Darvan). Polyacrylonitrile fibres are understood, above all, as polymers which contain more than 80%, for example 80 to 95%, of acrylonitrile; in addition they contain 5 to 20% of vinyl acetate, vinylpyridine, vinyl chloride, vinylidene chloride, acrylic acid, acrylic acid esters, methacrylic acid, methacrylic acid esters and the like. These products are sold, for example, under the following tradenames: "Acrilan 1656" (The Chemstrand Corporation, Decatur, Ala., USA), "Acrilan 41" (The Chemstrand Corporation), "Creslan" (American Cyanamid Company) "Orlon 44" (Du Pont), "Crylor HH" (Soc. Rhodiaceta SA, France), "Leacril N" (Applicazioni Chimice Societa per Azioni, Italy), "Dynel" (Union Carbide Chem. Corp), "Exlan" (Japan Exlan Industry Co., Japan), "Vonnel " (Mitsubishi, Japan), "Verel" (Tennessee Eastman, USA), "Zefran" (Dow Chemical, USA), "Wolcrylon" (Filmfabrik Agfa, Wolfen), "Ssaniw" (USSR) and also "Orlon 42" , "Dralon", "Courtelle" and the like.

On these fibres, which can also be dyed as mixtures with one another, the new dyestuffs give intense and level dyeings with good fastness to light and good general fastness properties, in particular good fastness to washing, perspiration and sublimation, crease-resistance and fastness to decatising, ironing, rubbing, carbonising, water, chlorinated water, seawater, drycleaning, cross-dyeing and solvents. The new dyestuffs according to the invention also exhibit, inter alia, good stability in a relatively wide pH range, a good affinity, for example in aqueous solutions of various pH values, and good fastness to kier-boiling. A further advantage is the good reserve on wool and other natural polyamide fibres as well as on cotton. The dyeings are distinguished by luminous shades.

The quaternised water-soluble dyestuffs generally have a low sensitivity to electrolytes and some of them have an outstandingly good solubility in water or polar solvents. Dyeing with the quaternised water-soluble dyestuffs is generally carried out in an aqueous, neutral or acid medium, at the boiling point under atmospheric pressure, or in a closed vessel at elevated temperature and under elevated pressure.

They can also be applied to the fibre materials by printing. For this purpose, for example, a printing paste which contains the dyestuff in addition to the auxiliaries customary in printing is used. They are also suitable for bulk dyeing polymerisation products of acrylonitrile, and also other plastic, optionally dissolved compositions, in shades which are fast to light and to washing, and are also suitable for dyeing oil paints or lacquers, or, finally, also for dyeing paper and mordanted cotton.

The water-soluble azo compounds, and their heavy metal complexes, which are obtainable according to the present process and its variants, are suitable for dyeing and printing very diverse materials, such as, for example, silk, leather, wool, synthetic fibres made of high molecular weight polyamides and high molecular weight polyurethanes and polyhydroxylic materials, such as, for example, cellulose-containing material of fibrous structure, such as linen, cellulose, regenerated cellulose, cotton and the like.

The non-metallised water-soluble azo compounds are particularly important dyestuffs.

The azo compounds which contain a fibre-reactive radical and a sulphonic acid group are the most important. These dyestuffs are preferably used for dyeing nitrogen-containing fibres, such as, for example, high molecular weight polyamides, high molecular weight polyurethanes, silk, leather and, in particular, wool, for example from a weakly acid, neutral or weakly alkaline bath, optionally with the addition of the customary auxiliaries, for example of ethylene oxide condensation products of high molecular amines, and, above all, cellulose materials, especially cotton, for example by the exhaustion process from a dilute liquor or from an alkaline aqueous bath, which optionally has a high salt content, and especially by the pad-dyeing process, according to which the goods are impregnated with aqueous dyestuff solutions, which optionally also contain salt, and the dyestuffs are fixed, after treatment with alkali or in the presence of alkali, optionally under the action of heat.

The water-soluble fibre-reactive dyestuffs are also suitable for printing, especially on cotton, but also for printing nitrogen-containing fibres, for example wool, silk or mixed fabrics containing wool.

The dyeings and prints are distinguished by interesting and valuable, very pure and brilliant shades. The dyeings and prints display good resistance to acid and alkalis and good resistance towards synthetic resin finishing agents, good fastness to light and, especially on cotton, outstanding wet fastness properties. The high degree of fixation and the ready removability of unfixed portions of dyestuff are also worthy of note.

In order to improve the wet fastness properties, it is advisable to subject the dyeings and prints obtained to thorough rinsing with cold and hot water, optionally with the addition of an agent which has a dispersing action and which promotes the diffusion of the unfixed portions.

In the examples which follow, the parts, unless otherwise stated, denote parts by weight and the precentages denote percentages by weight. The relationship between parts by weight and parts by volume is the same as that between grams and cubic centimeters.

INSTRUCTIONS 1

5.8 parts of 2,6-dichloro-3-nitropyridine are dissolved in 80 parts of alcohol, 5 parts of triethylamine are added dropwise and 3.2 parts of n-hexylamine are then added dropwise. The mixture is stirred at room temperature until the reaction is complete (about 24 hours). The reaction product, 6-chloro-2-hexylamino-3nitropyridine, is precipitated by adding 40 parts of water, filtered off and dried in vacuo.

3.85 parts of the product obtained above, 4.3 parts of a 24% strength ammonia solution and 20 parts of alcohol are heated in an autoclave for 12 hours at 120° to 130° C. The reaction mixture is evaporated in vacuo and the residue is extracted with ether. After distilling off the solvent from the ether solution, 6-amino-2hexylamino-3-nitropyridine is obtained as a yellow substance (melting point 69 to 73° C).

INSTRUCTIONS 2

5.18 parts of 2,6-dichloro-4-methyl-3-nitropyridine are dissolved in 70 parts of alcohol and 4 parts of triethylamine, followed by 3.3 parts of isopropoxypropylamine, are added dropwise. The mixture is stirred at room temperature until the reaction is complete (about 24 hours). 100 parts of water are then added and the mixture is extracted with ether. After distilling off the ether, 6-chloro-2-isopropoxypropylamino-4-methyl-3-nitropyridine remains.

5.29 parts of the product obtained above, 5.3 parts of a 24% strength ammonia solution and 20 parts of alcohol are heated in an autoclave for 12 hours at 120° to 130° C. The alcohol is then removed in vacuo and the residue is stirred with water and filtered off. The yellow product is 6-amino-2-isopropoxypropylamino-4-methyl-3-nitropyridine with a melting point of 91° to 94° C.

When the corresponding amount of 2,6-dichloro-3nitropyridine is used in place of 2,6-dichloro-4-methyl-3-nitropyridine and the same procedure is followed, 6-amino-2-isopropoxypropylamino-3-nitropyridine is obtained as a yellow substance (melting point 76° to 79° C).

INSTRUCTIONS 3

5.2 parts of 2,6-dichloro-4-amino-3nitropyridine are dissolved in 50 parts of alcohol and 4 parts of triethylamine, followed by 4.5 parts of isopropoxypropylamine, are added dropwise. The mixture is stirred at room temperature until the reaction is complete (about 24 hours). 100 parts of water are then added and the mixture is extracted with ether. After distilling off the ether, 4-amino-6-chloro-2-isopropoxypropylamino-3-nitropyridine remains.

7.2 parts of the product obtained above are dissolved in 30 parts of chlorobenzene and the solution is heated with 10 parts of ammonia gas in an autoclave for 30 hours at 150° to 160° C. The chlorobenzene is then removed by steam distillation and the product is extracted with chloroform. The extract is stirred with animal charcoal, filtered to give a clear filtrate and the solvent is then distilled off. 4,6-Diamino-2-isopropoxy-propylamino-3-nitropyridine is obtained as a yellow substance.

INSTRUCTIONS 4 a. 183 parts of concentrated sulphuric acid are initially introduced and 40 parts of 2-piperidino-3-cyano-4,6-diaminopyridine are introduced in portions, whilst stirring, the temperature being kept at 15° to 20° C by cooling with ice. When the starting material has completely dissolved, the solution is cooled to 10° to 15° C and, at this temperature, 25.8 parts of 50% mixed acid are added dropwise in the course of 20 to 30 minutes. When the addition is complete, the mixture is stirred thoroughly for 3 hours at room temperature. The solution is poured onto 150 parts of ice in such a way that the temperature does not exceed 20° to 25° C and the solution is then neutralised at room temperature, with external cooling, with concentrated sodium hydroxide solution. The brown product which has percipitated is filtered off, washed salt-free with 500 parts of water and dried in vacuo at 70° C.

b. 460 parts of sulphuric acid (85 to 90% strength) are initially introduced and 36 parts of the nitro product are introduced in portions, whilst stirring. The solution is stirred for 4 hours at 100° C (internal temperature), allowed to cool and poured onto 300 parts of ice in such a way that the temperature does not exceed 20° to 25° C. The solution is neutralised with concentrated sodium hydroxide solution, whilst cooling, and the brownish-black product is filtered off, washed salt-free with 300 parts of water and dried in vacuo at 70° C. a melting point of 132° to 135° C.

Instructions 5

36.6 parts of concentrated sulphuric acid are initially introduced and 20 parts of 2-ethylamino-3-cyano-4,6-diaminopyridine are introduced in portions, whilst stirring, the temperature being kept at 15° to 20° C by cooling with ice. When the starting material has completely dissolved, the solution is cooled to 10° to 15° C. 15.7 parts of mixed acid (50%) are added dropwise at this temperature. When the addition is complete, the mixture is stirred thoroughly for 3 hours at room temperature. The solution is poured onto 100 parts of ice in such a way that the temperature does not exceed 20° to 25° C; whilst cooling, the pH of the solution is adjusted to 2 with concentrated sodium hydroxide solution, the yellowish-brown hydrosulphate of the product precipitating out. This is filtered off and washed with 200 parts of ice water. The product is dried in vacuo at 70° C. When a sample was neutralised and extracted with chloroform, a yellow product with a melting point of 153° to 157° C was obtained on concentration of the extract, 180 parts of 85 to 90% strength sulphuric acid are initially introduced and 18 parts of the nitro product are introduced in portions, whilst stirring; the solution is stirred for 3 hours at 110° C (internal temperature), allowed to cool and poured onto 150 parts of ice in such a way that the temperature does not exceed 20° to 25° C. Whilst cooling, the pH of the solution is adjusted to 2 with concentrated sodium hydroxide solution, the yellowish-brown hydrosulphate of the product, which has precipitated, is filtered off, washed with 200 parts of ice water and dried in vacuo at 70° C; melting point of the base recrystallised from chloroform/petroleum ether: 122° to 125° C.

Instructions 6

5.75 parts of 6-chloro-2-isopropoxypropylamino-4-methyl-3-nitropyridine, 5 parts of dimethylaminopropylamine and 20 parts of alcohol are heated at 90° to 100° C for 12 hours. The excess amine and alcohol are distilled off in vacuo and the residue is extracted with chloroform. After distilling off the solvent from the chloroform solution, 6-dimethylaminopropylamino-2-isopropoxypropylamino-4-methyl-3-nitropyridine is obtained as a yellow substance.

Example 1

1.84 parts of 2,4-dinitroaniline are dissolved in 5.5 parts of concentrated sulphuric acid. The solution is diazotised at 20° C by adding 3.19 parts of 42% strength nitrosylsulphuric acid and the mixture is stirred for a further 2 hours. The diazo solution is added, at 0° to 5° C, to a solution of 2.44 parts of 2-anilino-6-methylamino-3-nitropyridine in 40 parts of dimethylformamide. When coupling is complete, the coupling mixture is diluted with ice water. The dyestuff is filtered off, mixed to a paste with alcohol, filtered off again and washed with alcohol. The resulting dyestuff of the formula

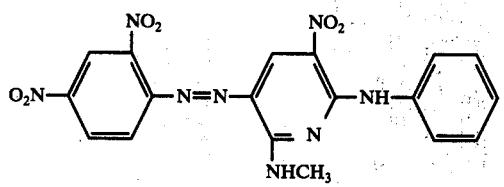

dyes polyester fibres in red shades with very good fastness properties.

The dyestuff of the formula

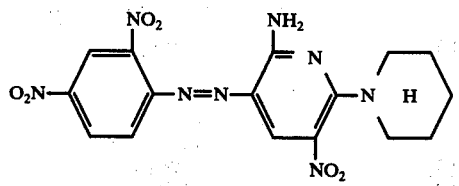

which dyes polyester fibres in red shades, is obtained analogously by coupling 1.84 parts of 2,4-dinitroaniline and 2.22 parts of 6-amino-2-piperidino-3-nitro-pyridine.

The coupling component is obtained as follows: 3-nitro-2,6-dichloropyridine is reacted first with piperidine (1 molar equivalent) and then with ammonia in alcohol (1 molar equivalent).

EXAMPLE 2

17.2 parts of 2-chloro-4-nitroaniline are mixed to a paste with 39 parts by volume of concentrated hydrochloric acid and the paste is stirred into a mixture of 400 parts of ice and water. The suspension is diazotised with 25 parts by volume of 4N sodium nitrite solution at 0° to 5° C. The diazo solution is added to a solution of 26.8 parts of 6-amino-2-isopropoxypropylamine-4-methyl-3-nitropyridine, obtained according to Instructions 2, in 400 parts of acetone. When coupling is complete, the dyestuff of the formula

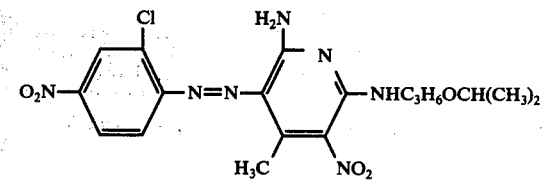

is isolated. It dyes polyester fibres in brilliant orange shades with excellent fastness properties

EXAMPLE 3

1.5 parts of sodium nitrite are sprinkled into 18 parts of concentrated sulphuric acid at 0° to 10° C until solution is complete, the solution is then cooled to 0° C and 20 parts by volume of a mixture of 4 parts of glacial acetic acid and 1 part of propionic acid are then added dropwise. A solution of 2.9 parts of 2-amino-5-nitro-thiazole in 20 parts by volume of a mixture of glacial acetic acid and propionic acid (4:1) is then added dropwise to the resulting solution and the reaction mixture is stirred for a further 3 hours at 0° to 5° C. 1.5 parts of urea are added in portions to this diazo solution. The diazo solution thus obtained is added to a solution of 4.8 parts of 2,4-diamino-6-piperidino-3-nitropyridine in 200 parts of acetone. The mixture is stirred for a further 15 hours and then diluted with ice water. The dyestuff which has precipitated out is filtered off, washed with water and dried. The dyestuff corresponds to the formula

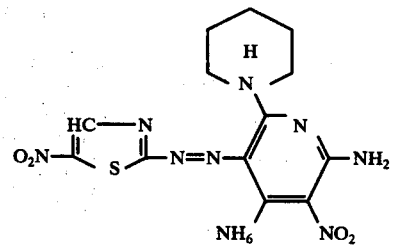

and dyes polyester fibres in red shades.

The dyestuffs indicated in Table I which follows are obtained by an analogous procedure:

TABLE I

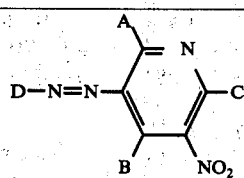

| Example | D | A | B | C | Colour shade on polyester fibers |
|---|---|---|---|---|---|
| 1 | 2,6-Dichloro-4-nitrophenyl | $NH_2$ | H | $NHC_6H_{13}$ | Orange |
| 2 | 2-Cyano-4-nitrophenyl | $NH_2$ | H | $NHC_3H_6OCH(CH_3)_2$ | Scarlet |

TABLE I-continued $$D-N=N- \text{(pyridine with A, B, NO}_2\text{, C substituents)}$$

| Example | D | A | B | C | Colour shade on polyester fibers |
|---|---|---|---|---|---|
| 3 | 2-Chloro-4,6-dinitrophenyl | NHC$_2$H$_4$COOC$_2$H$_5$ | H | NHC$_7$H$_{15}$ | Red |
| 4 | 4-(4'-Nitrophenyl)-azophenyl | NHC$_2$H$_4$OH | H | NHC$_6$H$_4$Cl (p) | Orange |
| 5 | 2-Methylsulphonyl-4-nitrophenyl | NHC$_3$H$_6$OCH$_3$ | H | NHCH$_2$C$_6$H$_5$ | Scarlet |
| 6 | 5-Acetyl-3-nitrothienyl-2- | NHC$_2$H$_4$COOH | H | NH-Cyclohexyl | Ruby |
| 7 | 6-Nitrobenzthiazol-2-yl | NH$_2$ | CH$_3$ | NHCH$_2$-furyl | Scarlet |
| 8 | 3-Phenyl-1,2,4-thiadiazolyl-5 | NH$_2$ | CH$_3$ | NHC$_2$H$_4$C$_6$H$_5$ | Golden yellow |
| 9 | 2-Cyano-4,6-dinitrophenyl | NHC$_3$H$_6$OC$_2$H$_5$ | CH$_3$ | NHC$_6$H$_4$CH$_3$ (m) | Ruby |
| 10 | 3-Methyl-4-nitro-1,2-isothiazol-5-yl | NHC$_2$H$_4$OH | CH$_3$ | NH-Cyclopentyl | Ruby |
| 11 | 4-(4'-Chlorophenyl)-azo-2-methoxy-5-methylphenyl | NHCH(CH$_3$)$_2$ | C$_4$H$_9$ | NHC$_2$H$_4$N(morpholinyl C=O) | Red |
| 12 | 6-Methylsulphonylbenzthiazol-2-yl | NH$_2$ | C$_2$H$_5$ | NHCH$_2$-tetrahydrofuryl | Scarlet |
| 13 | 4-Butylsulphonylphenyl | NHCH$_3$ | CH$_3$ | NHCH$_2$CON(CH$_3$)$_2$ | Golden yellow |
| 14 | 2-Chloro-4-nitrophenyl | NH$_2$ | NH$_2$ | NHC$_8$H$_{17}$ | Scarlet |
| 15 | 4-Benzyloxycarbonylphenyl | NHCH$_3$ | NH$_2$ | NHC$_6$H$_4$OCH$_3$ (p) | Orange |
| 16 | 2,6-Dicyano-4-nitrophenyl | NHC$_2$H$_5$ | NH$_2$ | NHC$_2$H$_4$OC$_6$H$_5$ | Ruby |
| 17 | 2,6-Dibromo-4-nitrophenyl | NHC$_2$H$_5$ | NH$_2$ | NHC$_4$H$_8$OH | Scarlet |
| 18 | 5,6-Dichlorobenzthiazol-2-yl | NHC$_2$H$_5$ | NH$_2$ | NHC$_5$H$_{11}$ | Scarlet |
| 19 | 5-Nitro-2,1-benzisothiazol-3-yl | NHC$_2$H$_5$ | NH$_2$ | NHC$_3$H$_6$OCH$_2$—CH—C$_4$H$_9$ \| C$_2$H$_5$ | Violet |
| 20 | 2-Bromo-6-cyano-4-nitrophenyl | NHC$_2$H$_5$ | NH$_2$ | NHC$_4$H$_9$ | Ruby |
| 21 | 2-Bromo-4,6-dinitrophenyl | NHC$_6$H$_{13}$ | NH$_2$ | NH$_2$ | Red |
| 22 | 4-Nitro-2-trifluoromethylphenyl | NHC$_8$H$_{17}$ | NH$_2$ | NH$_2$ | Orange |
| 23 | 4-Nitrophenyl | —N(piperidinyl) | NH$_2$ | NH$_2$ | Golden yellow |
| 24 | 5-Nitroimidazol-3-yl | —N(morpholinyl) | NH$_2$ | NH$_2$ | Orange |
| 25 | 2,5-Dichloro-4-dimethylaminosulphonylphenyl | NHCH(CH$_3$)$_2$ | NH$_2$ | NH$_2$ | Orange |
| 26 | 2-Bromo-6-methoxy-4-nitrophenyl | N(C$_4$H$_9$)$_2$ | NH$_2$ | NH$_2$ | Scarlet |
| 27 | 4-Phenylazophenyl | NH-Cyclohexyl | NH$_2$ | NH$_2$ | Golden yellow |
| 28 | 3-Methyl-1-phenylpyrazol-5-yl | N(CH$_3$)$_2$ | N(CH$_3$)$_2$ | NHC$_2$H$_5$ | Golden yellow |
| 29 | 4-Hexoxycarbonylphenyl | N(C$_2$H$_5$)$_2$ | N(C$_2$H$_5$)$_2$ | NHC$_3$H$_7$ | Golden yellow |
| 30 | 2-Methyl-4-nitrophenyl | NH-Cyclopentyl | NH$_2$ | NH$_2$ | Golden yellow |

EXAMPLE 4

4.57 parts of 4-aminophenacyltrimethylammonium chloride are dissolved in 20 parts of water and 8 parts by volume of concentrated hydrochloric acid are added to the solution. The solution is diazotised at 0° to 5° C by adding 5 parts by volume of 4N sodium nitrite solution. The diazo solution is added, at 0° to 5° C, to a solution of 5.04 parts of 2-sec.-butylamino-6-n-propylamino-3-nitropyridine in 50 parts of acetone. The coupling mixture is rendered neutral to Congo Red by adding sodium acetate solution. When coupling is complete, the acetone is distilled off under reduced pressure and the residual portion is diluted with 5% strength sodium chloride solution. The dyestuff is filtered off, dissolved in hot water and, after filtering the solution, salted out from the filtrate. The dyestuff of the formula

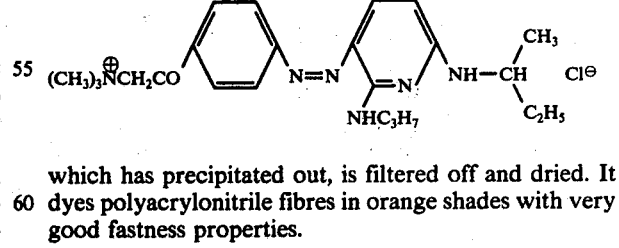

which has precipitated out, is filtered off and dried. It dyes polyacrylonitrile fibres in orange shades with very good fastness properties.

EXAMPLE 5

3.54 parts of 5-amino-3-phenyl-1,2,4-thiadiazole are dissolved in 20 parts by volume of formic acid. 1.4 parts of sodium nitrite are introduced at 0 to 5° C and the mixture is stirred for a further 30 minutes. 0.05 parts of sulphamic acid are then added. 9.58 parts of 3-(2'-isopropylamino-4'-methyl-3'-nitropyridine-6')-aminopropyl-1-trimethylammonium methosulphate are then introduced and rinsed in with 10 parts by volume of formic acid. The mixture is heated slowly to 60° C and stirred at this temperature for 2 hours. The paste is diluted with water and dissolved by heating and, after the solution has been filtered, the product is salted out of the filtrate with sodium bromide. The dyestuff of the formula

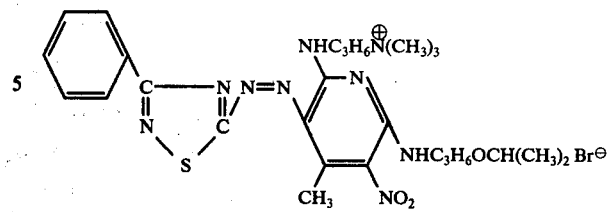

which has precipitated, is filtered off and dried. It dyes polyacrylonitrile fibres in orange shades with very good fastness properties.

The dyestuffs listed in Table II which follows were obtained in the same way.

TABLE II $$\left[\begin{array}{c} A \\ D-N=N- \\ B \end{array} \begin{array}{c} N \\ \diagup \\ \diagdown \\ NO_2 \end{array} C \right]^{\oplus} X^{\ominus}$$

| Ex. | D | A | B | C | X | Colour shade on polyacrylonitrile |
|---|---|---|---|---|---|---|
| 1 | (CH₃)₃NCH₂CO—⟨⟩—Br | NH₂ | CH₃ | NHCH₂CH₂C₆H₅ | Br | Golden yellow |
| 2 | (C₂H₅)₂NCH₂CO—⟨⟩— , OC₂H₅ | NHC₂H₄OH | C₄H₉ | NH-Cyclopentyl | Cl | Golden yellow |
| 3 | ⟨N⟩—CH₂CO—⟨⟩—N=N—⟨⟩—CH₃ | N(CH₃)₂ | N(CH₃)₂ | NHC₂H₅ | CH₃COO | Orange |
| 4 | O₂N—⟨⟩—OC₆H₄COC₂H₄N(CH₃)₃ | NHC₃H₆OCH₃ | H | ⟨N H⟩ | ½ SO₄ | Orange |
| 5 | (C₂H₅)₃NH₄C₂HNOC—⟨⟩— | NHCH(CH₃)₂ | NH₂ | NH₂ | I | Golden yellow |
| 6 | (CH₃)₃NH₄C₂OOC—⟨⟩— | NH₂ | NH₂ | NHC₄H₉ | CH₃SO₄ | Golden yellow |
| 7 | O₂N—⟨⟩—OC₂H₄N⟨⟩ | NH₂ | H | NHC₃H₇ | C₇H₇SO₃ | Orange |
| 8 | O₂N—⟨⟩—OC₂H₄N(CH₃)₂, OCH₃ | NHCH₃ | H | NH-Cyclohexyl | CH₃SO₃ | Orange |
| 9 | (C₂H₅)₂NH₄C₂HNO₂S—⟨⟩—, CH₃ | NHC₆H₁₃ | NH₂ | NH₂ | HSO₄ | Golden yellow |
| 10 | (CH₃)₂N—H₄C₂O₂S—⟨⟩—Cl, C₂H₅ , Cl | NHC₂H₅ | CH₃ | NHC₆H₄CH₃ (m) | C₂H₅SO₄ | Orange |

TABLE II-continued $$\left[ \begin{array}{c} D-N=N-\phantom{X}\\ \phantom{X} \end{array} \text{(pyridine with A, B, NO}_2\text{, C substituents)} \right]^{\oplus} X^{\ominus}$$

| Ex. | D | A | B | C | X | Colour shade on polyacrylonitrile |
|---|---|---|---|---|---|---|
| 11 | (3-methyl-thiadiazolyl-pyridine group) | NHCH₃ | NH₂ | NHC₆H₄OCH₃ (p) | CH₃SO₄ | Orange |
| 12 | (dimethylamino-piperazinyl-sulphonyl-benzthiazole group) | NHC₂H₄OH | H | NHC₆H₄Cl (p) | C₆H₅SO₃ | Scarlet |
| 13 | (N-methylpyridinium group) | NH₂ | H | NHC₃H₆OCH(CH₃)₂ | CH₃SO₄ | Orange |
| 14 | (CH₃-N-pyridyl group) | NHC₂H₅ | NH₂ | NHC₄H₈OH | ZnCl₃ | Orange |
| 15 | 4-Nitrophenyl | NHC₂H₄N(CH₃)₂ \| C₂H₅ | NH₂ | NH₂ | ZnCl₃ | Orange |
| 16 | 5-Nitrothiazol-2-yl | NHC₃H₆N(CH₃)₂ \| CH₂C₆H₅ | NH₂ | NH₂ | Cl | Violet |
| 17 | 4-(4'-Nitrophenyl)-azophenyl | NHC₃H₆N(CH₃)₂ \| C₂H₄CONH₂ | NH₂ | NH₂ | CH₃COO | Orange |
| 18 | 2-Chloro-4-nitrophenyl | (piperazinyl-dimethyl group) | NH₂ | NH₂ | ⅓ PO₄ | Orange |
| 19 | 2,5-Dichloro-4-dimethylamino-sulphonylphenyl | NH₂ | H | NHC₄H₈—N(piperidinyl) | C₇H₇SO₃ | Orange |
| 20 | 4-Phenylazophenyl | NHC₂H₅ | H | NHC₂H₄N(CH₃)₂ \| OCH₃ | CH₃SO₃ | Orange |
| 21 | 5-Nitro-2,1-benzisothiazol-3-yl | NHCH₃ | H | NHC₃H₆N(CH₃)₃ | CH₃SO₄ | Violet |
| 22 | 2,6-Dibromo-4-nitrophenyl | NHC₂H₄OH | H | NHC₃H₆N(CH₃)₂ \| NH₂ | CH₃SO₃ | Scarlet |
| 23 | 5-Acetyl-3-nitrothienyl-2 | NHC₃H₇ | H | NHC₃H₆N(CH₃)₂ \| CH₂CH₂OH | Br | Ruby |
| 24 | 6-Methylsulphonylbenzthiazol-2-yl | NHC₂H₄OCH₃ | CH₃ | NHC₂H₄N(C₂H₅)₃ | C₂H₅SO₄ | Scarlet |
| 25 | 2-Methoxy-4-nitrophenyl | NHCH(CH₃)₂ | C₄H₉ | NHC₃H₆N(CH₃)₂ | CH₃SO₄ | Orange |
| 26 | 6-Bromo-2-cyano-4-nitrophenyl | NHC₃H₆N(CH₃)₃ | CH₃ | NHC₆H₅ | ⅓ PO₄ | Ruby |
| 27 | 5,6-Dichlorobenzthiazol-2-yl | NHC₂H₄N(C₂H₅)₂ \| CH₃ | CH₃ | NH-Cyclohexyl | CH₃COO | Scarlet |
| 28 | 3-Methyl-4-nitro-1,2-isothiazol-5-yl | NHC₃H₆N(CH₃)₃ | CH₃ | NHCH₂C₆H₅ | HSO₄ | Red-violet |
| 29 | 4-Dimethylaminocarbonylphenyl | NHCH₃ | NH₂ | NHC₃H₆N(CH₃)₃ | CH₃SO₄ | Golden yellow |
| 30 | 3-Phenyl-1,2,4-thiadiazol-5-yl | NHC₂H₅ | NH₂ | NHC₂H₄N(CH₃)₃ | C₆H₅SO₃ | Orange |
| 31 | 2-Cyano-4-nitrophenyl | NHC₂H₅ | NH₂ | NHC₃H₆N(CH₃)₃ | CH₃SO₄ | Scarlet |
| 32 | 5-Nitroindazol-3-yl | NHC₂H₅ | NH₂ | NHC₃H₆N(CH₃)₃ | Cl | Orange |

EXAMPLE 6

1.84 parts of 2,4-dinitroaniline are diazotised as indicated in Example 1 and the diazotisation product is coupled with 2.53 parts of 2-dimethylaminopropylamino-6-methylamino-3-nitropyridine in 40 parts of dimethylformamide. When coupling is complete, the pH of the mixture is adjusted to 9 with sodium hydroxide solution. The dyestuff which has precipitated is filtered off, washed with water and dried.

4.48 parts of the dyestuff obtained above are dissolved in 150 parts of hot dimethylformamide. 2 parts of The dyestuffs listed in Table III which follows were obtained in the same way as above.

TABLE III

D—N=N—[pyridine with A, B, NO₂, C] + alkylating agent

| Ex. | D | A | B | C | Alkylating agent | Colour shade on polyacrylonitrile |
|---|---|---|---|---|---|---|
| 1 | (CH₃)₂NCH₂CO—C₆H₄— | NHC₂H₅ | NH₂ | NH₂ | C₆H₅CH₂Cl | Golden yellow |
| 2 | cyclohexyl-NH-CO-C₃H₆-NH—C₆H₄—N=N—(2,5-(OCH₃,CH₃)C₆H₃)— | NH₂ | H | NHC₃H₆OCH(CH₃)₂ | C₇H₇SO₃CH₃ | Scarlet |
| 3 | O₂N—C₆H₃(OC₂H₄N(CH₃)OCH₃)— | NHC₂H₄OH | H | NHC₆H₅ | (CH₃)₂SO₄ | Orange |
| 4 | CH₃—N(piperazine)N—O₂S—C₆H₂(Br,Br)— | NHCH₃ | CH₃ | NHCH(CH₃)(C₂H₅) | Ethylene oxide in acetic acid | Orange |
| 5 | (CH₃)₂NH·C₂H₄·CHNOC—benzothiazol-2-yl | NHC₂H₅ | CH₃ | NHC₄H₉ | (C₂H₅)₂SO₄ | Scarlet |
| 6 | (CH₃)₂NH·C₂H₄·CS—thiadiazol-2-yl | NHC₂H₅ | NH₂ | NHC₃H₆OCH₃ | CH₃Br | Orange |
| 7 | 2-Bromo-4-nitrophenyl | N(CH₃)₂ | N(CH₃)₂ | NHC₂H₄N(CH₃)₂ | (CH₃)₂SO₄ | Scarlet |
| 8 | 4-Phenylazophenyl | NHCH₃ | H | NHC₂H₄-(pyridyl) | (CH₃)₂SO₄ | Orange |
| 9 | 6-Nitrobenzthiazol-2-yl | NHC₃H₆N(CH₃)₂ | H | NHC₂H₄OH | C₆H₅SO₃CH₃ | Scarlet |
| 10 | 3-Phenyl-1,2,4-thiadiazol-5-yl | NHC₃H₇ | CH₃ | NHC₂H₄—N(piperidine)H | ClCH₂CH₂CONH₂ | Orange |
| 11 | 5-Chlorobenz-2,1-isothiazol-3-yl | NHC₃H₆N(CH₃)₂ | CH₃ | NHC₂H₅ | C₄H₉Br | Red |
| 12 | 3,5-Dinitrothienyl-2 | NHC₂H₅ | NH₂ | NHC₃H₆N(CH₃)₂ | (CH₃)₂SO₄ | Red-violet | dimethyl sulphate are added dropwise and the reaction mixture is stirred for 3 hours at 95° to 100° C. The solvent is removed in vacuo and the residue is dissolved in hot water and, after the solution has been filtered, the product is salted out from the filtrate with sodium chloride. The dyestuff of the formula

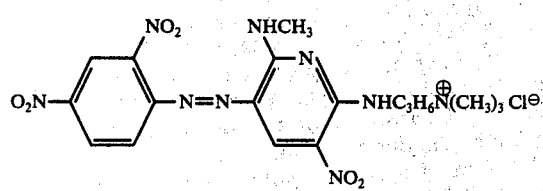

which has precipitated, dyes polyacrylonitrile fibres in scarlet red shades with very good fastness properties.

EXAMPLE 7

3.6 parts of 2-amino-6-methoxybenzthiazole are diazotised as indicated in Example 3 and the diazotisation product is coupled with 5.9 parts of 6-ethylamino-2,4-diamino-3-nitropyridine in 60 parts of glacial acetic acid. 4.8 parts of the dyestuff obtained above are dissolved in 150 parts of hot dimethylformamide. 2 parts of dimethyl sulphate are added dropwise and the reaction mixture is stirred for a further 3 hours at 95° to 100° C. The solvent is removed in vacuo and the residue is dissolved in hot water and, after the solution has been filtered, the product is salted out from the filtrate with sodium chloride.

The dyestuff of the formula

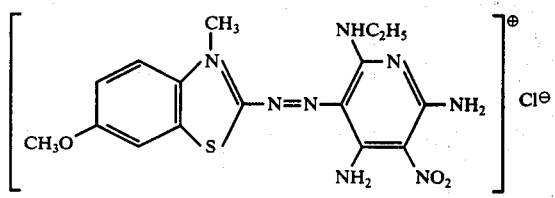

which has precipitated, dyes polyacrylonitrile fibres in reddish orange shades.

The dyestuffs listed in Table IV which follows were obtained in the same way as above.

TABLE IV

D—N=N—[pyridine ring with A, B, C, NO₂]—C + alkylating agent

| Ex. | D | A | B | C | Alkylating agent | Colour shade on polyacrylonitrile |
|-----|---|---|---|---|------------------|-----------------------------------|
| 1 | Thiazol-2-yl | NHC₄H₉ | NH₂ | NH₂ | (CH₃)₂SO₄ | Orange |
| 2 | Pyridin-3-yl | [N-piperidinyl] | NH₂ | NH₂ | (C₂H₅)₂SO₄ | Yellow |
| 3 | 3-Methyl-1,2-isothiazol-5-yl | NHCH(CH₃)₂ | NH₂ | NH₂ | C₇H₇SO₃CH₃ | Orange |
| 4 | 3-Methyl-1-phenylpyrazol-5-yl | NHC₂H₅ | H | NHC₆H₅ | ClC₂H₄OH | Yellow |
| 5 | 1,2,4-Triazol-3-yl | NHCH₃ | H | NH-Cyclohexyl | BrCH₂CONH₂ | Yellow |
| 6 | Indazol-3-yl | NHC₂H₅ | CH₃ | NHC₂H₆OCH₃ | (CH₃)₂SO₄ | Orange |
| 7 | Benz-2,1-isothiazol-3-yl | NHC₃H₇ | CH₃ | NHC₄H₉ | (CH₃)₂SO₄ | Red |
| 8 | 5-Methyl-1,3,4-thiadiazol-2-yl | NHC₂H₅ | NH₂ | NHC₃H₆OCH(CH₃)₂ | (CH₃)₂SO₄ | Orange |
| 9 | 1,2,4-Thiadiazol-5-yl | NHC₂H₅ | NH₂ | NHC₄H₉ | (CH₃)₂SO₄ | Orange |

EXAMPLE 8

2.53 parts of aniline-2,4-disulphonic acid are dissolved in 4 parts by volume of concentrated hydrochloric acid and 40 parts of ice water. The solution is diazotised at 0° to 5° C by adding 2.5 parts by volume of 4N sodium nitrite solution. The diazo solution is added, at 0° to 5° C, to a solution of 2.1 parts of 2,6-bis-ethylamino-3-nitropyridine in 20 parts of acetone. The coupling mixture is rendered neutral to Congo Red by adding sodium acetate solution. When coupling is complete, the acetone is distilled off under reduced pressure and the residual portion is diluted with 10% strength sodium chloride solution. The dyestuff is filtered off and dissolved in hot water and, after the solution has been filtered, salted out from the filtrate. The dyestuff of the formula

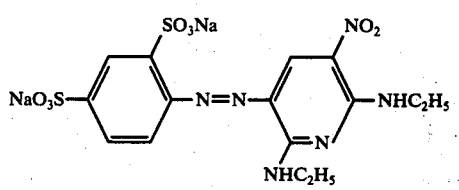

which has precipitated, is filtered off and dried. It dyes wool and polyamide fibres in orange shades with very good fastness properties.

EXAMPLE 9

5.42 parts of dibromopropionyl m-phenylenediamine-sulphonic acid are suspended in 50 parts of water, 20 parts by volume of a 4N naphthalenesulphonic acid solution are added and the mixture is then diazotised with 10 parts by volume of 1N sodium nitrite solution. The diazo solution is added to a suspension of 2.95 parts of 6-ethylamino-2,4-diamino-3-nitropyridine in 20 parts of 2N acetic acid. The pH of the reaction mixture is adjusted to 7 with sodium acetate solution. When coupling is complete, the dyestuff is dissolved in water, the solution is filtered to give a clear filtrate and the product is salted out with sodium chloride. The dyestuff of the formula

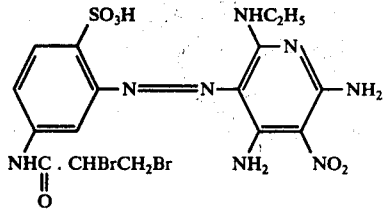

which has precipitated, is filtered off and dried. It dyes wool and polyamide fibres in reddish yellow shades with very good fastness properties.

Using a similar procedure, a dyestuff which dyes both wool and polyamide in fast golden yellow shades is obtained using 2-amino-5-dibromopropionylamino-4'-methyl-1,1'-diphenylsulphone-3'-sulphonic acid as the diazo component and a dyestuff which dyes cotton in fast yellow shades is obtained using 2-chloro-4-(3'-sulphophenyl)-amino-6-(3"-amino-4"-sulphophenyl)-aminotriazine.

DYEING INSTRUCTIONS I 1 part of the dyestuff obtained according to Example 1 is ground wet with 2 parts of a 50% strength aqueous solution of the sodium salt of dinaphthylmethanedisulphonic acid and the mixture is dried.

This dyestuff formulation is stirred with 40 parts of a 10% strength aqueous solution of the sodium salt of N-benzyl-μ-heptadecyl-benzimidazoledisulphonic acid and 4 parts of a 40% strength acetic acid solution are added. 4,000 parts of a dye bath are prepared from this mixture by dilution with water.

100 parts of a cleaned polyester fibre material are introduced into this bath at 50° C, the temperature is raised to 120° to 130° C in the course of half an hour and the material is dyed at this temperature for one hour in a closed vessel. It is then rinsed well. A deep red dyeing with outstanding fastness to light and sublimation is obtained.

DYEING INSTRUCTIONS II 1 part of the dyestuff obtained according to Example 2 is dissolved in 2,000 parts of water, with the addition of 4 parts of 40% strength acetic acid, 1 part of crystalline sodium acetate and 10 parts of anhydrous sodium sulphate. 100 parts of a dried yarn of polyacrylonitrile staple fibres are introduced into this dyebath at 60° C, the temperature is raised to 100° C in the course of half an hour and the yarn is dyed for one hour at the boil. The orange dyeing is then rinsed well and dried.

DYEING INSTRUCTIONS III 10 parts of a woollen flannel are introduced, at 40° C, into a bath which contains 0.5 parts of Glauber's salt, 0.4 parts by volume of acetic acid and 0.2 parts of the dyestuff according to Example 3, in 500 parts of water. The temperature is raised to the boil at an even rate in the course of 30 minutes and the woollen flannel is dyed for a further hour at the boil. The dyed goods are then rinsed and finished in the customary manner. A very uniform orange dyeing is obtained.

If the same amount of sulphuric acid is used in place of acetic acid and dyeing is carried out as indicated above, a yellow dyeing with the same properties is obtained.

DYEING INSTRUCTIONS IV 10 parts of a synthetic polyamide fabric are introduced, at 40° C, into a dyebath which contains 0.40 parts of 40% strength acetic acid, 0.25 parts of the sulphonate of ricinoleic acid butyl ester and 0.20 parts of the dyestuff of Example 3, in 500 parts of water. The temperature is raised to the boiling point at an even rate in the course of 30 minutes and the fabric is dyed for a further one hour, whilst simmering. The fabric is then rinsed and dried. A uniform orange dyeing which displays good fastness to washing and light is obtained.

We claim:
1. An azo dyestuff, free from sulfo groups, of the formula

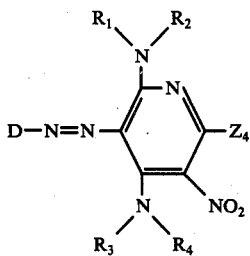

wherein
D is the radical of an aromatic or heterocyclic diazo component,

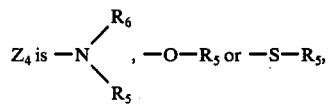

$R_1$, $R_2$, $R_3$, $R_4$, $R_5$ and $R_6$ are independently hydrogen; alkyl of up to 10 carbon atoms, alkoxyalkyl of up to 10 carbon atoms, alkoxyalkoyalkyl of up to 10 carbon atoms, or said alkyl, alkoxyalkyl or alkoxyalkoxyalkyl which are further substituted by hydroxy, carboxy, cyano, phenoxy, cyclohexyloxy, benzyloxy, phenethoxy, $C_2$-$C_{10}$-alkanoyloxy, formyloxy, $C_1$-$C_5$-alkylaminocarbonyloxy, benzoyloxy, phenoxyacetoxy, phenylacetoxy, phenylcarbamyloxy, $C_1$-$C_5$-alkoxycarbonyloxy, phenyloxycarbonyloxy, phenyl or phenyl substituted by chloro, bromo, fluoro, $C_1$-$C_4$-alkyl, $C_1$-$C_4$-alkoxy, hydroxyethyl, cyano, nitro, $C_2$-$C_5$-alkanoylamino, or $C_2$-$C_5$ carboalkoxy;

cyclohexyl or cyclopentyl; or phenyl or phenyl substituted by bromo, chloro, fluoro, cyano, nitro, hydroxy, $C_1$-$C_4$-alkylcarbonylamino, hydroxy, $C_1$-$C_4$-alkoxy, $C_1$-$C_4$-alkyl or $C_1$-$C_4$-alkoxy; or $R_1$ and $R_2$, and $R_3$ and $R_4$, and $R_5$ and $R_6$ independently represent, together with the nitrogen to which they are attached, piperidino, morpholino or pyrrolidino;

and wherein said aromatic or heterocyclic diazo component is phenyl or phenyl substituted by halo, hydroxy, cyano, thiocyano, nitro, lower alkyl, trifluoromethyl, lower alkoxy, formyl, lower alkylcarbonyl, benzoyl, methylbenzoyl, lower alkoxycarbonyl, benzyloxycarbonyl, cyclohexylcarbonyl, phenoxycarbonyl, lower alkozycarbonyloxy, benzyloxycarbonyloxy, lower alkylcarbonyloxy, benzoyloxy, lower alkylcarbonylamino, benzoylamino, lower alkylsulfonyl, chloroethylsulphonyl, hydroxyethylsulphonyl, aminosulphonyl, di-(hydroxyethyl)-aminosulphonyl, phenylaminosulphonyl, chlorophenylaminosulphonyl, methoxyphenylaminosulphonyl, benzylaminosulphonyl, N-piperidylsulphonyl, N-morpholinosulphonyl, lower alkylsulphonyloxy, cyclohexylsulphonyloxy, chloromethyl-sulphonyloxy, cyanoethylsulphonyloxy, phenylsulphonyloxy, aminosulphonyloxy, chlorophenylsulphonyloxy, methoxyphenylsulphonyloxy, N-morpholinosulphonyloxy, ethyleneiminosulphonyloxy, lower monoalkyl- or dialkyl-aminosulphonyloxy, phenylaminosulphonyloxy, N-phenyl-N(lower alkyl)-aminosulphonyloxy, N-(methoxy- or chloro-) phenylaminosulphonyloxy, phenylamino, nitrophenylamino, dinitrophenylamino, phenyl, phenoxy or acetylaminophenyl;

phenylazophenyl which is unsubstituted or substituted by chloro, bromo, hydroxy, cyano, nitro, lower alkyl, trifluoromethyl lower alkoxy or phenoxy;

napthyl which is unsubstituted or substituted by methoxy, ethoxy, phenylazo or dimethylaminosulphonyl;

thiazolyl which is unsubstituted or substituted by chloro, bromo, nitro, cyano, thiocyano, lower alkyl, lower alkoxy, lower alkylmercapto, phenyl, benzyl, phenethyl, lower alkoxycarbonyl, trifluoromethyl, lower alkylcarbonyl or lower alkylsulphonyl;

benzthiazolyl which is unsubstituted or substituted by chloro, bromo, cyano, thiocyano, nitro, lower alkyl, lower alkoxy, benzyl, phenylethyl, lower alkylsulphonyl, phenyl, lower alkylmercapto, lower alkoxycarbonyl, lower alkylcarbonyl, trifluoromethyl, cyanoethylsulphonyl, aminosulphonyl, or lower mono- or dialkylaminosulphonyl;

pyrazolyl which is unsubstituted or substituted by cyano, lower alkyl, lower alkoxy, lower alkoxycarbonyl or phenyl;

thiadiazolyl which is unsubstituted or substituted by lower alkoxy, lower alkyl, phenyl, lower alkylsulphonyl, or lower alkylmercapto;

imidazolyl which is unsubstituted or substituted by nitro or lower alkyl;

thienyl which is unsubstituted or substituted by nitro, lower alkyl, lower alkylsulphonyl, lower alkoxycarbonyl or acetyl;

isothiazolyl which is unsubstituted or substituted by lower alkyl, nitro, lower alkylsulphonyl, lower alkoxycarbonyl, cyano or phenyl; or benzisothiazolyl which is unsubstituted or substituted by lower alkyl, nitro or halo.

2. An azo dyestuff according to claim 1, wherein $R_1$, $R_2$, $R_3$ and $R_4$ each denote hydrogen.

3. An azo dyestuff, free from sulfo groups, of the formula

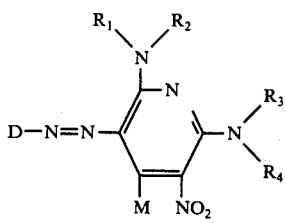

wherein

D is the radical of an aromatic or heterocyclic diazo component,

M is hydrogen, alkyl of up to 5 carbon atoms or phenyl, $R_1$, $R_2$, $R_3$ and $R_4$ are independently hydrogen; alkyl of up to 10 carbon atoms, alkoxyalkyl of up to 10 carbon atoms, alkoxyalkoxyalkyl of up to 10 carbon atoms, or said alkyl, alkoxyalkyl or alkoxyalkoxyalkyl which are further substituted by hydroxy, carboxy, cyano, phenoxy, cyclohexyloxy, benzyloxy, phenethoxy, $C_2$-$C_{10}$-alkanoyloxy, formyloxy, $C_1$-$C_5$-alkylaminocarbonyloxy, benzoyloxy, phenoxyacetoxy, phenylacetoxy, phenylcarbamyloxy, $C_1$-$C_5$-alkoxycarbonyloxy, phenyloxycarbonyloxy phenyl or phenyl substituted by chloro, bromo, fluoro, $C_1$-$C_4$-alkyl, $C_1$-$C_4$-alkoxy, hydroxyethyl, cyano, nitro, $C_2$-$C_5$-alkanoylamino or $C_2$-$C_5$-carbalkoxy;

cyclohexyl or cyclopentyl; or phenyl or phenyl substituted by bromo, chloro, fluoro, cyano, nitro, hydroxy, $C_1$-$C_4$-alkylcarbonylamino, hydroxy $C_1C_4$-alkoxy, $C_1$-$C_4$-alkyl or $C_1$-$C_4$-alkoxy; or $R_1$ and $R_2$, and $R_3$ and $R_4$, independently represent, together with the nitrogen to which they are attached, piperidino, morpholino or pyrrolidino;

and wherein said aromatic or heterocyclic diazo component is phenyl or phenyl substituted by halo, hydroxy, cyano, thiocyano, nitro, lower alkyl, trifluoromethyl, lower alkoxy, formyl, lower alkylcarbonyl, benzoyl, methylbenzoyl, lower alkoxycarbonyl, benzyloxycarbonyl, cyclohexylcarbonyl, phenoxycarbonyl, lower alkoxycarbonyloxy, benzyloxycarbonyloxy, lower alkylcarbonyloxy, benzoyloxy, lower alkylcarbonylamino, benzoylamino, lower alkylsulfonyl, chloroethylsulphonyl, hydroxyethylsulphonyl, aminosulphonyl, di-(hydroxyethyl)-aminosulphonyl, phenylaminosulphonyl, chlorophenylaminosulphonyl, methoxyphenylaminosulphonyl, benzylaminosulphonyl, N-piperidylsulphonyl, N-morpholinosulphenyl, lower alkylsulphonyloxy, cyclohexylsulphonyloxy, chloromethylsulphonyloxy, cyanoethylsulphonyloxy, phenylsulphonyloxy, aminosulphonyloxy, chlorophenylsulphonyloxy, metoxyphenylsulphonyloxy, N-morpholinosulphonyloxy, ethyleneiminosulphonyloxy, lower monoalkyl- or dialkyl-aminosulphonyloxy, phenylaminosulphonyloxy, N-phenyl-N(lower alkyl)-aminosulphonyloxy, N-(methoxy- or chlorophenylaminosulphonyloxy, phenylamino, nitrophenylamino, dinitrophenylamino, phenyl, phenoxy or acetylaminophenyl;

phenylazophenyl which is unsubstituted or substituted by chloro, bromo, hydroxy, cyano, nitro, lower alkyl, trifluoromethyl lower alkoxy or phenoxy;

napthyl which is unsubstituted or substituted by methoxy, ethoxy, phenylazo or dimethylaminosulphonyl;

thiazolyl which is unsubstituted or substituted by chloro, bromo, nitro, cyano, thiocyano, lower alkyl, lower alkoxy, lower alkylmercapto, phenyl, benzyl, phenethyl, lower alkoxycarbonyl, trifluoromethyl, lower alkylcarbonyl or lower alkylsulphonyl:

benzthiazolyl which is unsubstituted or substituted by chloro, bromo, cyano, thiocyano, nitro, lower alkyl, lower alkoxy, benzyl, phenylethyl, lower alkylsulphonyl, phenyl, lower alkyl mercapto, lower alkoxycarbonyl, lower alkylcarbonyl, trifluoro methyl, cyanoethylsulphonyl, aminosulphonyl, or lower mono- or di alkylaminosulphonyl;

pyrazolyl which is unsubstituted or substituted by cyano lower alkyl, lower alkoxy, lower alkoxycarbonyl or phenyl thiadiazolyl which is unsubstituted or substituted by lower alkoxy, lower alkyl, phenyl, lower alkylsulphonyl, or lower alkylmercapto;

imidazolyl which is unsubstituted or substituted by nitro or lower alkyl;

thienyl which is unsubstituted or substituted by nitro, lower alkyl, lower alkylsulphonyl, lower alkoxycarbonyl or acetyl;

isothiazolyl which is unsubstituted or substituted by lower alkyl, nitro, lower alkylsulphonyl, lower alkoxycarbonyl, cyano or phenyl; or benzisothiazolyl which is unsubstituted or substituted by lower alkyl, nitro or halo.

4. A dyestuff according to claim 3, wherein M is methyl or hydrogen.

5. A basic azo dyestuff, free from acid groups conferring solubility in water, of the formula

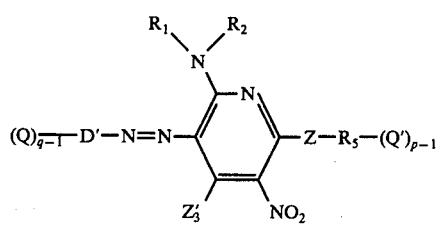

wherein

D' is the radical of an aromatic or heterocyclic diazo component, with the proviso that when p and q are both 1, D' is a heterocyclic diazo component having a quaternised ring nitrogen;

p and q independently are 1 or 2;

$Z_3'$ is hydrogen, alkyl of up to 5 carbon atoms, phenyl or $-NR_3R_4$;

$R_1$, $R_2$, $R_3$, $R_4$, $R_5$ and $R_6$ are independently hydrogen; alkyl of up to 10 carbon atoms, alkoxyalkyl of up to 10 carbon atoms, alkoxyalkoxyalkyl of up to 10 carbon atoms, or said alkyl, alkoxyalkyl or alkoxyalkoxyalkyl which are further substituted by hydroxy, cyano, phenoxy, cyclohexyloxy, benzyloxy, phenethoxy, $C_2$- $C_{10}$-alkanoyloxy, formyloxy, $C_1$-$C_5$-alkylaminocarbonyloxy, benzyloxy, phenoxyacetoxy, phenylacetoxy, phenylcarbamyloxy, $C_1$-$C_5$-alkoxycarbonyloxy, phenyloxycarbonyloxy, phenyl or phenyl substituted by chloro, bromo, fluoro, $C_1$- $C_4$-alkyl, $C_1$-$C_4$-alkoxy, hydroxyethyl, cyano, nitro, $C_2$-$C_5$-alkanoylamino, or $C_2$-$C_5$ carboalkoxy; cyclohexyl or cyclopentyl; or phenyl or phenyl substituted by bromo, chloro, fluoro, cyano, nitro, hydroxy, $C_1$-$C_4$-alkylcarbonylamino, hydroxy, $C_4$- $C_4$-alkoxy, $C_1$-$C_4$-alkyl or $C_1$-$C_4$-alkoxy; or $R_1$ and $R_2$, $R_3$ and $R_4$, $R_5$ and $R_6$ independently represent, together with the nitrogen to which they are attached, piperidino, morpholino or pyrrolidino;

Z is $-O-$, $-S-$ or

wherein $R_6$ is as defined above;

Q and Q' are independently

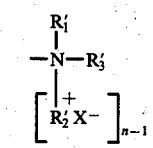

or

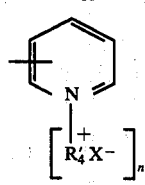

wherein $R_1'$, $R_2'$, $R_3'$ and $R_4'$ are independently lower alkyl, benzyl or cyclohexyl, $R_1'$, $R_2'$, and $R_3'$ additionally represents hydrogen, $R_3'$ additionally represents amino or alkoxy;

n is 1 or 2 and X represents an anion; or

Q', conjointly with $R_5$ and Z is piperazinyl or 3-picolylamino; and wherein Q is bonded directly to the aromatic or heterocyclic nucleus of the diazo component or is linked thereto via an alkylene, alkyleneoxy, alkylenecarbonyl, carbonyloxy, carbonylamino, alkylenecarbonyloxy, alkylcarbonylamino, alkylsulphonylamino or alkylenessulphonyl bridge, and wherein Q' is bonded directly to $R_5$ or is bonded to $R_5$ via an alkylenecarbonyl, carbonyloxy, carbonylamino, alkylenecarbonyloxy, alkylcarbonylamino, alkyl-sulphonylamino, or alkylenesulphonyl bridge; and wherein said aromatic or heterocyclic diazo component is phenyl or phenyl substituted by halo, hydroxy, cyano, thiocyano, nitro, lower alkyl, trifluoromethyl, lower alkoxy, formyl, lower alkylcarbonyl, benzoyl, methylbenzoyl, lower alkoxycarbonyl, benzyloxycarbonyl, cyclohexylcarbonyl, phenoxycarbonyl, lower alkoxycarbonyloxy, benzyloxycarbonyloxy, lower alkylcarbonyloxy, benzoyloxy, lower alkylcarbonylamino, benzoylamino, lower alkylsulfonyl, chloroethylsulphonyl, hydroxyethylsulphonyl, aminosulphonyl, di-(hydroxyethyl)-aminosulphonyl, phenylaminosulphonyl, chlorophenylaminosulphonyl, methoxyphenylaminosulphonyl, benzylaminosulphonyl, N-piperidylsulphonyl, N-morpholinosulphonyl, lower alkylsulphonyloxy, cyclohexylsulphonyloxy, chloromethylsulphonyloxy, cyanoethylsulphonyloxy, phenylsulphonyloxy, aminosulphonyloxy, chlorophenylsulphonyloxy, methoxyphenylsulphonyloxy, N-morpholinosulphonyloxy, ethyleneiminosulphonyloxy, lower monoalkyl- or dialkyl-aminosulphonyloxy, phenylaminosulphonyloxy, N-phenyl-N(lower alkyl)-aminosulphonyloxy, N-(methoxy- or chloro-) phenylaminosulphonyloxy, phenylamino, nitrophenylamino, dinitrophenylamino, phenyl, phenoxy or acetylaminophenyl;

phenylazophenyl which is unsubstituted or substituted by chloro, bromo, hydroxy, cyano, nitro, lower alkyl, trifluoromethyl lower alkoxy or phenoxy;

napthyl which is unsubstituted or substituted by methoxy, ethoxy, phenylazo or dimethylaminosulphonyl;

thiazolyl which is unsubstituted or substituted by chloro, bromo, nitro, cyano, thiocyano, lower alkyl, lower alkoxy, lower alkylmercapto, phenyl, benzyl, phenethyl, lower alkoxycarbonyl, trifluoromethyl, lower alkylcarbonyl or lower alkylsulphonyl;

benzthiazolyl which is unsubstituted or substituted by chloro, bromo, cyano, thiocyano, nitro, lower alkyl, lower alkoxy, benzyl, phenylethyl, lower alkylsulphonyl, phenyl, lower alkylmercapto, lower alkoxycarbonyl, lower alkylcarbonyl, trifluoromethyl, cyanoethylsulphonyl, aminosulphonyl, or lower mono- or dialkylaminosulphonyl;

pyrazolyl which is unsubstituted or substituted by cyano, lower alkyl, lower alkoxy, lower alkoxycarbonyl or phenyl;

thiadiazolyl which is unsubstituted or substituted by lower alkoxy, lower alkyl, phenyl, lower alkylsulphonyl, or lower alkylmercapto;

imidazolyl which is unsubstituted or substituted by nitro or lower alkyl;

thienyl which is unsubstituted or substituted by nitro, lower alkyl, lower alkylsulphonyl, lower alkoxycarbonyl or acetyl;

isothiazolyl which is unsubstituted or substituted by lower alkyl, nitro, lower alkylsulphonyl, lower alkoxycarbonyl, cyano or phenyl; or benzisothiazolyl which is unsubstituted or substituted by lower alkyl, nitro or halo;

and the quaternary ring nitrogen ammonium salts of said heterocyclic diazo components having a ring nitrogen.

6. An azo dyestuff according to claim 5 wherein $Z_3'$ is methyl.

7. An azo dyestuff according to claim 5 wherein Q is

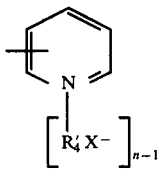

and is bonded directly to the nucleus of said diazo component or is linked via a carbonyloxy or carbonylamino bridge.

8. An azo dyestuff according to claim 5, the anion of which is the anion of a hydrogen halide acid, nitric sulfuric, phosphoric, benzenesulphonic, benzoic, aliphatic $C_1$-$C_4$ carboxylic, aliphatic $C_1$-$C_4$ sulfonic, or $C_1$-$C_4$ alkylsulfuric hemiester acid or a double salt thereof with zinc halide or cadmium halide.

9. An azo dyestuff according to claim 1, wherein $R_1$, $R_2$, $R_3$ and $R_4$ each denote hydrogen.

10. An azo dyestuff according to claim 1 wherein D is phenyl or phenyl substituted by halo, hydroxy, cyano, thiocyano, nitro, lower alkyl, trifluoromethyl, lower alkoxy, formyl, lower alkylcarbonyl, benzoyl, methylbenzoyl, lower alkoxycarbonyl, benzyloxycarbonyl, cyclohexylcarbonyl, phenoxycarbonyl, lower alkoxycarbonyloxy, benzyloxycarbonyloxy, lower alkylcarbonyloxy, benzoyloxy, lower alkylcarbonylamino, benzoylamino, lower alkylsulfonyl, chloroethylsulphonyl, hydroxyethylsulphonyl, aminosulphonyl, di-(hydroxyethyl)-aminosulphonyl, phenylamino-sulphonyl, chlorophenylaminosulphonyl, methoxyphenylaminosulphonyl, benzylaminosulphonyl, N-piperidylsulphonyl, N-morpholinosulphonyl, lower alkylsulphonyloxy, cyclohexylsulphonyloxy, chloromethylsulphonyloxy, cyanoethylsulphonyloxy, phenylsulphonyloxy, aminosulphonyloxy, chlorophenylsulphonyloxy, methoxyphenylsulphonyloxy, N-morpholinosulphonyloxy, ethyleneiminosulphonyloxy, lower monoalkyl- or dialkyl-aminosulphonyloxy, phenylaminosulphonyloxy, N-phenyl-N(lower alkyl)-aminosulphonyloxy, N-(methoxy- or chloro-)phenylaminosulphonyloxy, phenylamino, nitrophenylamino, dinitrophenylamino, phenyl, phenoxy or acetylaminophenyl;

phenylazophenyl which is unsubstituted or substituted by chloro, bromo, hydroxy, cyano, nitro, lower alkyl, trifluoromethyl lower alkoxy or phenoxy;

napthyl which is unsubstituted or substituted by methoxy, ethoxy, phenylazo or dimethylaminosulphonyl;

thiazolyl which is unsubstituted or substituted by chloro, bromo, nitro, cyano, thiocyano, lower alkyl, lower alkoxy, lower alkylmercapto, phenyl, benzyl, phenethyl, lower alkoxycarbonyl, trifluoromethyl, lower alkylcarbonyl or lower alkylsulphonyl; benzthiazolyl which is unsubstituted or substituted by chloro, bromo, cyano, thiocyano, nitro, lower alkyl, lower alkoxy, benzyl, phenylethyl, lower alkylsulphonyl, phenyl, lower alkylmercapto, lower alkoxycarbonyl, lower alkylcarbonyl, trifluoromethyl, cyanoethylsulphonyl, aminosulphonyl, or lower mono- or dialkylaminosulphonyl;

pyrazolyl which is unsubstituted or substituted by cyano, lower alkyl, lower alkoxy, lower alkoxycarbonyl or phenyl;

thiadiazolyl which is unsubstituted or substituted by lower alkoxy, lower alkyl, phenyl, lower alkylsulphonyl, or lower alkylmercapto;

imidazolyl which is unsubstituted or substituted by nitro or lower alkyl;

thienyl which is unsubstituted or substituted by nitro, lower alkyl, lower alkylsulphonyl, lower alkoxycarbonyl or acetyl;

isothiazolyl which is unsubstituted or substituted by lower alkyl, nitro, lower alkylsulphonyl, lower alkoxycarbonyl, cyano or phenyl; or benzisothiazolyl which is unsubstituted or substituted by lower alkyl, nitro or halo.

11. A water-soluble azo dyestuff of the formula

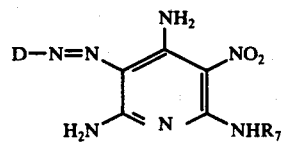

wherein D is phenyl or naphthyl which are substituted by one or two sulfo, and are further unsubstituted or substituted by lower alkyl, lower alkoxy, halo, hydroxyl, nitro, $NH_2$-, carboxyl, acyl, acyloxy, acylamino, alkylsulphonyl, arylsulphonyl, aminosulphonyl, cyano or alkoxycarbonyl or a group of the formula -NH-Y wherein Y is a fiber-reactive radical selected from $\alpha,\beta$-dibromopropionyl, $\alpha$-bromoacryloylamino, 4,6-dihalogeno-s-triazin-2-yl and 4-halogeno-6-amino-(alkoxy, phenoxy or alkylmercapto)-s-triazin-2-yl;

$R_7$ is phenyl which is unsubstituted or substituted by sulfo, halo, lower alkyl, lower alkoxy, carboxy, acylamino or -NH-Y;

wherein acyl is alkanoyl of up to 5 carbon atoms, alkylcarbamyl of up to 5 carbon atoms, alkyloxycarbonyl of up to 5 carbon atoms, phenylcarbamyl, phenoxycarbonyl, benzoyl, phenoxyacetyl, chloroacetyl or phenylacetyl; and when D is substituted by hydroxy, $NH_2$-, carboxy or lower alkoxy ortho to the azo group, the iron, manganese, nickel, copper, cobalt and chromium complexes thereof.

12. A water-soluble azo dyestuff according to claim 11, of the formula

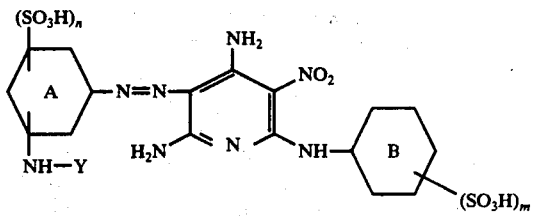

wherein
$n$ is 1 or 2,
$m$ is 0, 1 or 2,
the benzene ring A is further unsubstituted or substituted by halo, lower alkyl, lower alkoxy, nitro or carboxyl, the benzene ring B is further unsubstituted or substituted by lower alkyl, lower alkoxy, nitro, carboxyl, acylamino or -NH-Y.
13. A dyestuff according to claim 3 of the formula
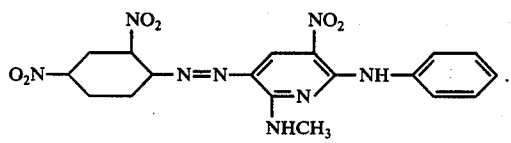
14. A dyestuff according to claim 5 of the formula
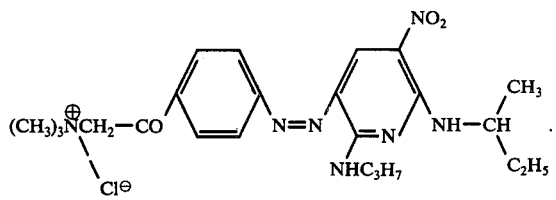
15. A dyestuff of the formula
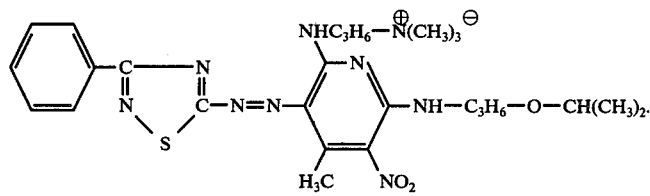
16. A dyestuff of the formula
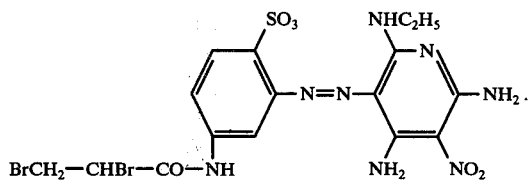
* * * * *

UNITED STATES PATENT AND TRADEMARK OFFICE
CERTIFICATE OF CORRECTION

PATENT NO. : 4,068,085
DATED : JANUARY 10, 1978
INVENTOR(S) : VISVANATHAN RAMANATHAN ET AL.

It is certified that error appears in the above-identified patent and that said Letters Patent are hereby corrected as shown below:

Claim 1, Col. 46, line 28 reads "alkozycarbonyloxy" should read --alkoxycarbonyloxy--.

Claim 3, Col. 48, line 7 reads "metoxy-" should read --methoxy--.

Claim 3, Col. 48, line 38 reads "cyano lower" should read --cyano, lower--.

Claim 5, Col. 49, between lines 24-25 reads "$C_4 - C_4$" should read --$C_1 - C_4$--.

Claim 5, Col. 49, line 64 reads "alkylenessul-" should read --alkylenesul---.

Signed and Sealed this

Eighteenth Day of March 1980

[SEAL]

Attest:

SIDNEY A. DIAMOND

Attesting Officer

Commissioner of Patents and Trademarks